(12) United States Patent
Kagaya

(10) Patent No.: US 8,151,307 B2
(45) Date of Patent: Apr. 3, 2012

(54) OPERATION REPRODUCING METHOD, OPERATION REPRODUCING APPARATUS AND SYSTEM

(75) Inventor: Naoto Kagaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1141 days.

(21) Appl. No.: 11/548,505

(22) Filed: Oct. 11, 2006

(65) Prior Publication Data

US 2007/0088779 A1    Apr. 19, 2007

(30) Foreign Application Priority Data

Oct. 14, 2005 (JP) ................. 2005-300163

(51) Int. Cl.
*H04N 7/18* (2006.01)
*H04N 7/16* (2011.01)
(52) U.S. Cl. ............... 725/78; 725/80; 725/153
(58) Field of Classification Search .......... None
See application file for complete search history.

(56) References Cited

U.S. PATENT DOCUMENTS

| | | | |
|---|---|---|---|
| 6,014,672 A | 1/2000 | Satoh et al. | |
| 6,748,278 B1 * | 6/2004 | Maymudes | 700/17 |
| 2003/0218613 A1 * | 11/2003 | Yamamura et al. | 345/520 |
| 2005/0094610 A1 * | 5/2005 | de Clerq et al. | 370/338 |
| 2005/0097618 A1 * | 5/2005 | Arling et al. | 725/114 |
| 2005/0198378 A1 * | 9/2005 | Okada | 709/238 |
| 2006/0149809 A1 * | 7/2006 | Salo et al. | 709/203 |

FOREIGN PATENT DOCUMENTS

| | | |
|---|---|---|
| EP | 0554854 A | 8/1993 |
| EP | 1336932 A | 8/2003 |
| GB | 2263988 A | 8/1993 |
| GB | 2304214 A | 3/1997 |
| JP | 10-63685 | 3/1998 |
| JP | 2000-10829 | 1/2000 |
| JP | 2000-175136 | 6/2000 |

OTHER PUBLICATIONS

The above references were cited in a Jun. 10, 2009 European Search Report of the counterpart European Patent Application No. 06019861./1.

* cited by examiner

*Primary Examiner* — Brian Pendleton
*Assistant Examiner* — Jason Lin
(74) *Attorney, Agent, or Firm* — Cowan, Liebowitz & Latman, P.C.

(57) ABSTRACT

Operation history information in which information on an operation using multiple devices on a network performed in another system is recorded is acquired from the other system, and it is determined whether or not the operation performed in the other system is reproducible based on the operation history information. And the operation determined to be reproducible is presented to a user so as to reproduce the operation selected by the user. Reproduction can be executed simply and securely without being conscious of configurations and capabilities of devices in the system on the part of the user.

11 Claims, 21 Drawing Sheets

FIG. 8

| OPERATION | OPERATION CONTENTS |
|---|---|
| 1 | SEARCH FOR CONTENT OF BROADCAST RECORDING APPARATUS AND REPRODUCE IT ON DISPLAY APPARATUS |
| 2 | SIMULTANEOUSLY REPRODUCE CONTENTS OF BROADCAST RECORDING APPARATUS AND STATIC IMAGE OF CAMERA APPARATUS ON DISPLAY APPARATUS |
| 3 | REPRODUCE STATIC IMAGE OF CAMERA APPARATUS ON DISPLAY APPARATUS AND THEN REPRODUCE VIDEO OF VIDEO APPARATUS |
| 4 | STORE STATIC IMAGE OF CAMERA APPARATUS IN STORAGE APPARATUS TO BE PRINTED BY PRINTER APPARATUS |
| 5 | SHOOT MOVING IMAGE WITH NETWORK CAMERA APPARATUS AND TRANSMIT IT TO DISPLAY APPARATUS BY VIDEO STREAMING TO BE REPRODUCED THEREON |
| 6 | WHILE REPRODUCING VIDEO OF VIDEO APPARATUS ON DISPLAY APPARATUS, DISPLAY STATIC IMAGE OF CAMERA APPARATUS AT 2 MIN AND 30 SEC |
| 7 | WHILE REPRODUCING VIDEO OF VIDEO APPARATUS ON DISPLAY APPARATUS, RECORD IT IN STORAGE APPARATUS |
| 8 | REPRODUCE LOW-RESOLUTION VIDEO OF VIDEO APPARATUS ON DISPLAY APPARATUS |
| 9 | REPRODUCE HIGH-RESOLUTION VIDEO OF VIDEO APPARATUS ON DISPLAY APPARATUS |
| 10 | SEARCH FOR CONTENT OF STORAGE APPARATUS AND REPRODUCE IT ON DISPLAY APPARATUS |

FIG. 9A

| OPERATION | OPERATION COMMAND | DEVICE FOR USE | CAPABILITY FOR USE | CONTENTS |
|---|---|---|---|---|
| 1 | STB—>BROADCAST RECORDING (SEARCH)<br>STB—>BROADCAST RECORDING (DATA TRANSFER)<br>STB—>DISPLAY APPARATUS (DISPLAY) | BROADCAST RECORDING, DISPLAY APPARATUS, STB | VIDEO SEARCH, VIDEO REPRODUCTION | |
| 2 | STB—>BROADCAST RECORDING (DATA TRANSFER)<br>STB—>CAMERA APPARATUS (DATA TRANSFER)<br>STB—>DISPLAY APPARATUS (DISPLAY) | BROADCAST RECORDING, CAMERA APPARATUS, DISPLAY APPARATUS, STB | VIDEO REPRODUCTION, IMAGE REPRODUCTION, 2-SCREEN DISPLAY | BROADCAST CONTENTS<br>STATIC IMAGE DATA |
| 3 | STB—>CAMERA APPARATUS (DATA TRANSFER)<br>STB—>DISPLAY APPARATUS (DISPLAY)<br>STB—>VIDEO APPARATUS (DATA TRANSFER)<br>STB—>VIDEO APPARATUS (DISPLAY) | CAMERA APPARATUS, VIDEO APPARATUS, DISPLAY APPARATUS, STB | VIDEO REPRODUCTION, IMAGE REPRODUCTION | STATIC IMAGE DATA<br>MOVING IMAGE DATA |
| 4 | STB—>CAMERA APPARATUS (DATA TRANSFER)<br>STB—>STORAGE APPARATUS (STORAGE)<br>STB—>STORAGE APPARATUS (PRINTING) | CAMERA APPARATUS, STORAGE APPARATUS, PRINTER APPARATUS, STB | IMAGE STORAGE, IMAGE PRINTING | |
| 5 | STB—>NETWORK CAMERA (STREAMING TRANSFER)<br>STB—>DISPLAY APPARATUS (DISPLAY) | NETWORK CAMERA, DISPLAY APPARATUS, STB | VIDEO REPRODUCTION, STREAMING DISTRIBUTION | |

FIG. 9B

| OPERATION | OPERATION COMMAND | DEVICE FOR USE | CAPACITY FOR USE | CONTENTS |
|---|---|---|---|---|
| 6 | STB→VIDEO APPARATUS (DATA TRANSFER)<br>STB→DISPLAY APPARATUS (DISPLAY)<br>STB→CAMERA APPARATUS (DATA TRANSFER)<br>STB→DISPLAY APPARATUS (SIMULTANEOUS REPRODUCTION) | CAMERA APPARATUS,<br>VIDEO APPARATUS,<br>DISPLAY APPARATUS,<br>STB | VIDEO REPRODUCTION,<br>IMAGE REPRODUCTION,<br>2-SCREEN DISPLAY | STATIC IMAGE DATA,<br>MOVING IMAGE DATA |
| 7 | STB→VIDEO APPARATUS (DATA TRANSFER)<br>STB→DISPLAY APPARATUS (DISPLAY)<br>STB→VIDEO APPARATUS (DATA TRANSFER)<br>STB→STORAGE APPARATUS (STORAGE) | VIDEO APPARATUS,<br>DISPLAY APPARATUS,<br>STORAGE APPARATUS,<br>STB | VIDEO DISPLAY,<br>VIDEO STORAGE,<br>MULTIPLE DELIVERIES | |
| 8 | STB→VIDEO APPARATUS (LOW-RESOLUTION SHOOTING)<br>STB→VIDEO APPARATUS (DATA TRANSFER)<br>STB→DISPLAY APPARATUS (REPRODUCTION) | VIDEO APPARATUS,<br>DISPLAY APPARATUS,<br>STB | LOW IMAGE QUALITY,<br>VIDEO RECORDING,<br>LOW IMAGE QUALITY,<br>VIDEO REPRODUCTION | |
| 9 | STB→VIDEO APPARATUS (HIGH-RESOLUTION SHOOTING)<br>STB→VIDEO APPARATUS (DATA TRANSFER)<br>STB→DISPLAY APPARATUS (REPRODUCTION) | VIDEO APPARATUS,<br>DISPLAY APPARATUS,<br>STB | HIGH IMAGE QUALITY,<br>VIDEO RECORDING,<br>HIGH IMAGE QUALITY,<br>VIDEO REPRODUCTION | |
| 10 | STB→STORAGE APPARATUS (SEARCH)<br>STB→STORAGE APPARATUS (DATA TRANSFER)<br>STB→DISPLAY APPARATUS (DISPLAY) | DISPLAY APPARATUS,<br>STORAGE APPARATUS,<br>STB | VIDEO/IMAGE SEARCH,<br>VIDEO/IMAGE REPRODUCTION | |

FIG. 10A

| DEVICE | CAPABILITY | USAGE STATE | RESERVATION |
|---|---|---|---|
| ACCESS POINT | HISTORY RECORD, DEVICE ACCESS | AVAILABLE | |
| STB | USER OPERATION INPUT, IMAGE ENCODING AND DECODING | AVAILABLE | |
| DISPLAY APPARATUS | HIGH-RESOLUTION DISPLAY, 2-SCREEN DISPLAY | AVAILABLE | |
| BROADCAST RECORDING | CONTENTS STORAGE, DELIVERY AND SEARCH | AVAILABLE | |
| CAMERA APPARATUS | STATIC IMAGE SHOOTING, LOW-RESOLUTION MOVING IMAGE SHOOTING, DATA DISTRIBUTION | UNAVAILABLE | |
| VIDEO APPARATUS | HIGH-RESOLUTION MOVING IMAGE SHOOTING | UNAVAILABLE | |
| STORAGE APPARATUS | CONTENTS STORAGE, DELIVERY AND SEARCH, PRINTING | AVAILABLE | |
| NETWORK CAMERA | HIGH-RESOLUTION VIDEO SHOOTING, STREAMING DISTRIBUTION | AVAILABLE | |
| PRINTER | PRINTING | AVAILABLE | RESERVED |

FIG. 10B

| DEVICE | CAPABILITY | USAGE STATE | RESERVATION |
|---|---|---|---|
| ACCESS POINT | HISTORY RECORD, DEVICE ACCESS | AVAILABLE | |
| STB | USER OPERATION INPUT, IMAGE ENCODING AND DECODING | AVAILABLE | |
| DISPLAY APPARATUS | HIGH-RESOLUTION DISPLAY | AVAILABLE | |
| BROADCAST RECORDING | CONTENTS STORAGE, DELIVERY AND SEARCH | AVAILABLE | |
| CAMERA APPARATUS | STATIC IMAGE SHOOTING, LOW-RESOLUTION MOVING IMAGE SHOOTING, DATA DISTRIBUTION | AVAILABLE | RESERVED |
| VIDEO APPARATUS | HIGH-RESOLUTION MOVING IMAGE SHOOTING | UNAVAILABLE | |
| PC APPARATUS | CONTENTS STORAGE, DELIVERY, PRINTING | AVAILABLE | |

OPERATION REPRODUCING METHOD, OPERATION REPRODUCING APPARATUS AND SYSTEM

BACKGROUND OF THE INVENTION

1. Field of the Invention

The present invention relates to a technique capable of reproducing an operation of using multiple devices on a network performed in another system.

2. Description of the Related Art

In recent years, there are devices having a storage function such as a camera for shooting contents other than a personal computer (PC) and a dedicated storage apparatus. There are also display apparatuses for displaying the contents stored in such devices.

In such a configuration, there exists an operating apparatus for manipulating a series of actions across the devices, such as processing and displaying stored contents data and displaying multiple pieces of contents data so as to control the series of actions.

Furthermore, it is also possible to record an operation history of the above-mentioned series of actions across the devices. There is also an apparatus for controlling communication among the devices, which can record operation commands, communicated contents and results of processing by the devices and the like.

In reproducing the contents in such a situation, there are many cases where a user wants to reproduce a certain action. For instance, in reproducing image data of a video camera, there are cases where the user wants to display static image data existing in the camera simultaneously at a certain time and repeat the same action later.

In such a system, the same operation is repeated each time. In such a system, there are also cases where a processing script is created and implemented to reproduce the operation. Furthermore, in such a system, there are also cases where the operation history is taken to reproduce the operation therefrom.

In such a situation, there is a proposed system of recording the history of a certain operation to have it used and reproduced by another person (refer to Patent Document 1: Japanese Patent Laid-Open No. 10-063685 for instance).

There is also a proposed system of creating an easily reproducible script file from a log file of an operating procedure and including a procedure reproducing program capable of reproducing it (refer to Patent Document 2: Japanese Patent Laid-Open No. 2000-010829 for instance).

Furthermore, there is also a proposed system of storing operational information and information on the devices used for the operation, analogizing the devices used in the past from their status and operational information, and analogizing and performing the operational contents (refer to Patent Document 3: Japanese Patent Laid-Open No. 2000-175136 for instance).

However, the above conventional techniques have the following problems.

(1) In the case of having the same operation work on another system, the contents are moved and the same operation is performed to reproduce that action each time.

(2) As it is not known how the other person operated, reproduced, viewed and printed the delivered contents, it is not sure which action is the most efficient and the most effective. It is not sure which action can be performed to the contents either.

(3) In the case of reproducing the action on another system by using a script or the like, if the configuration and equipment capability of the other system are different, it cannot be sure whether the action is reproducible unless the actual action is performed. And the script of which action is performable cannot be determined in advance either.

(4) Even in the case of the same configuration, it is not sure whether capability resources of the devices for performing the action are available. The action is actually performed and negotiations are conducted with the devices in the order of action, and it turns out that the reproduction is impossible in the middle of the action.

(5) Even in the same system, there are the cases where the action is not reproducible because the capability resources of the devices necessary for the action are in use, their power is off or they are moved outside communication of the system. Also in this case, the action is actually performed and negotiations are conducted with the devices in the order of action, and it turns out that the reproduction is impossible in the middle of the action.

SUMMARY OF THE INVENTION

The present invention has been made to solve the problems, and an object thereof is to present to a user an operation reproducible in the user's system based on operation history information in which the information on operations performed in other systems is recorded.

To achieve this object, according to an aspect of the present invention, there is provided an operation reproducing method of a system capable of reproducing an operation using multiple devices on a network performed in another system, comprising: an acquisition step of acquiring operation history information in which information on the operation using multiple devices on the network performed in the another system is recorded from the another system; a determination step of determining whether or not the operation performed in the another system is reproducible based on the operation history information; and a presentation step of presenting to a user the operation determined to be reproducible in the determination step.

Moreover, according to an aspect of the present invention, there is provided an operation reproducing apparatus of a system capable of reproducing an operation using multiple devices on a network performed in another system, comprising: an acquisition unit adapted to acquire operation history information in which information on the operation using multiple devices on the network performed in the another system is recorded from the another system; a determination unit adapted to determine whether or not the operation performed in the another system is reproducible based on the operation history information; and a presentation unit adapted to present to a user the operation determined to be reproducible by the determination unit.

Moreover, according to an aspect of the present invention, there is provided a system capable of reproducing an operation using multiple devices on a network performed in another system, comprising: an acquisition unit adapted to acquire operation history information in which information on the operation using multiple devices on the network performed in the another system is recorded from the another system; a determination unit adapted to determine whether or not the operation performed in the another system is reproducible based on the operation history information; and a presentation unit adapted to present to a user the operation determined to be reproducible by the determination unit.

Further features of the present invention will become apparent from the following description of exemplary embodiments (with reference to the attached drawings).

BRIEF DESCRIPTION OF THE DRAWINGS

FIG. 8 is a diagram showing a list representing operation contents of a user;

FIGS. 9A and 9B are diagrams showing the configuration of an operation history table;

FIGS. 10A and 10B are diagrams showing an example of the configuration of a device status management table which is managed by system;

DESCRIPTION OF THE EMBODIMENTS

A detailed description will be given below as preferred embodiments for implementing the present invention with reference to the attached drawings. This embodiment will exemplify and describe the case where multiple devices are connected to a network constructed by wireless access points of a wireless LAN system. Here, the multiple devices are a set-top box (an STB hereafter) including a display apparatus, a camera apparatus, a video shooting apparatus, a network camera apparatus, a broadcast contents recording and reproducing apparatus and a storage apparatus connected with a printer apparatus. The wireless access points function as an operation recording apparatus and a communication control device while the STB functions as an operation input device. Furthermore, the camera apparatus, video shooting appara-tus, network camera apparatus, broadcast contents recording and reproducing apparatus and storage apparatus function as storage devices while the display apparatus and printer apparatus function as reproducing devices.

(System Configuration)

Figure 1:
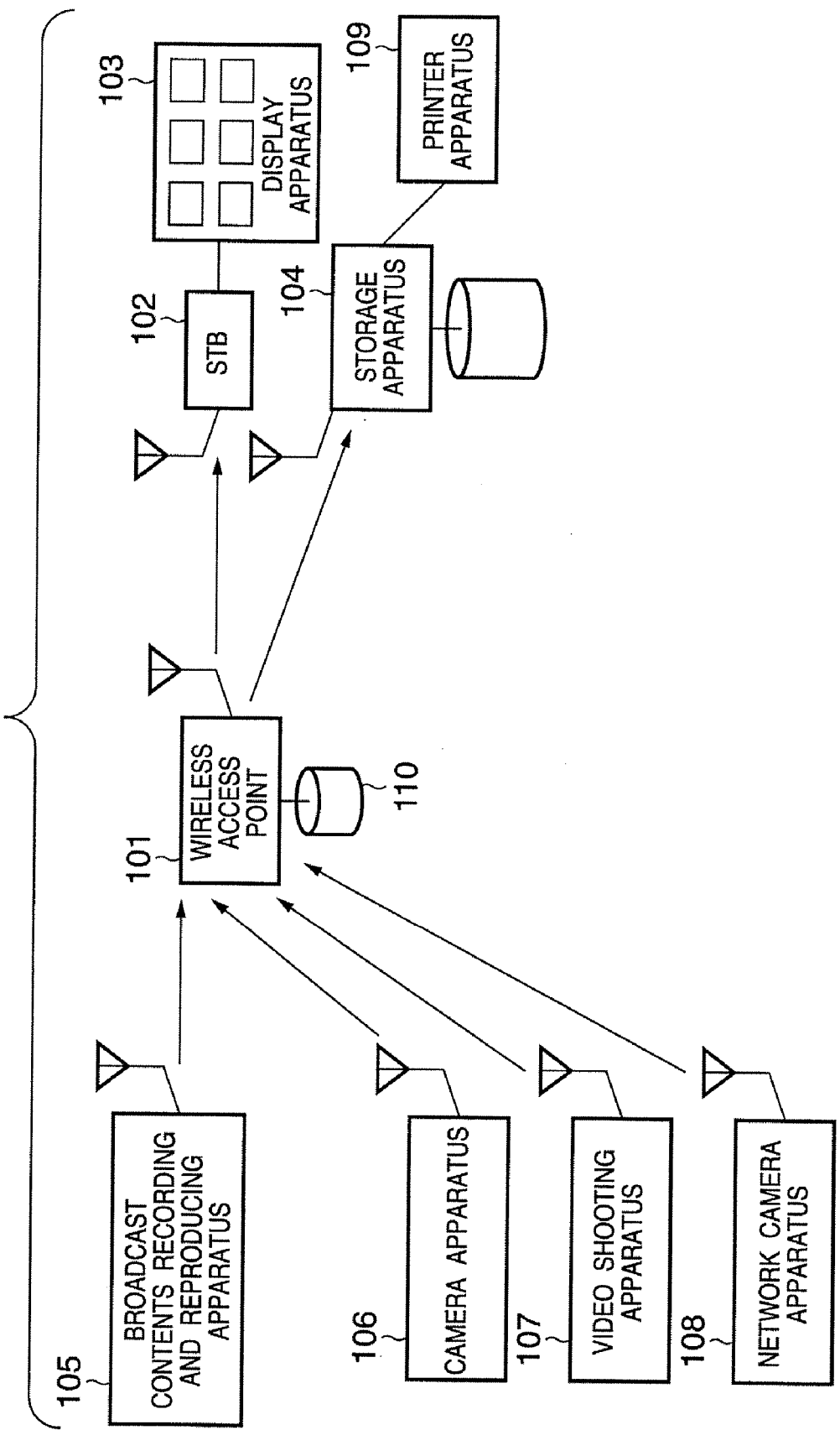
FIG. 1 is a diagram showing an example of a configuration of a wireless LAN system according to this embodiment.

FIG. 1 is a diagram showing an example of a configuration of the wireless LAN system according to this embodiment. In FIG. 1, a wireless access point 101 controls communication of a wireless LAN, manages and controls the devices configuring the wireless LAN system, analyzes an operation command and further recognizes sending and receiving of data so as to create operation history data. An STB 102 follows a user operation and temporarily records and converts contents data recorded in the devices and a storage apparatus 104 and the data sent from the devices so as to display them on a display apparatus 103. The display apparatus 103 displays the contents according to an operation of the STB 102.

The storage apparatus 104 can store the contents data existing in the devices, create and record a thumbnail, reproduction data on characterizing portions, detailed metadata and the like described later and search for and deliver the recorded data according to control from the STB 102. The broadcast contents recording and reproducing apparatus 105 can receive and record broadcast contents, reproduce them according to the control from the STB 102 and send the reproduction data over the network. A camera apparatus 106 can shoot a still image, create the thumbnail and the like, shoot a moving image of a low resolution and send each piece of image data over the network according to the control from the STB 102.

A video shooting apparatus 107 can shoot a moving image of a high resolution and send that video data over the network according to the control from the STB 102. A network camera apparatus 108 can shoot a moving image of a high resolution and send the data by video streaming over the network according to the control from the STB 102. A printer apparatus 109 prints the data recorded in the storage apparatus 104. A portable storage device 110 is the portable storage device such as a hard disk, a DVD or a memory capable of recording the data stored in the wireless access point 101 and available to another system.

Here, a hardware configuration of the devices 101 to 109 configuring the wireless LAN system will be described in turn by using FIGS. 2 to 7 below.

Figure 2:
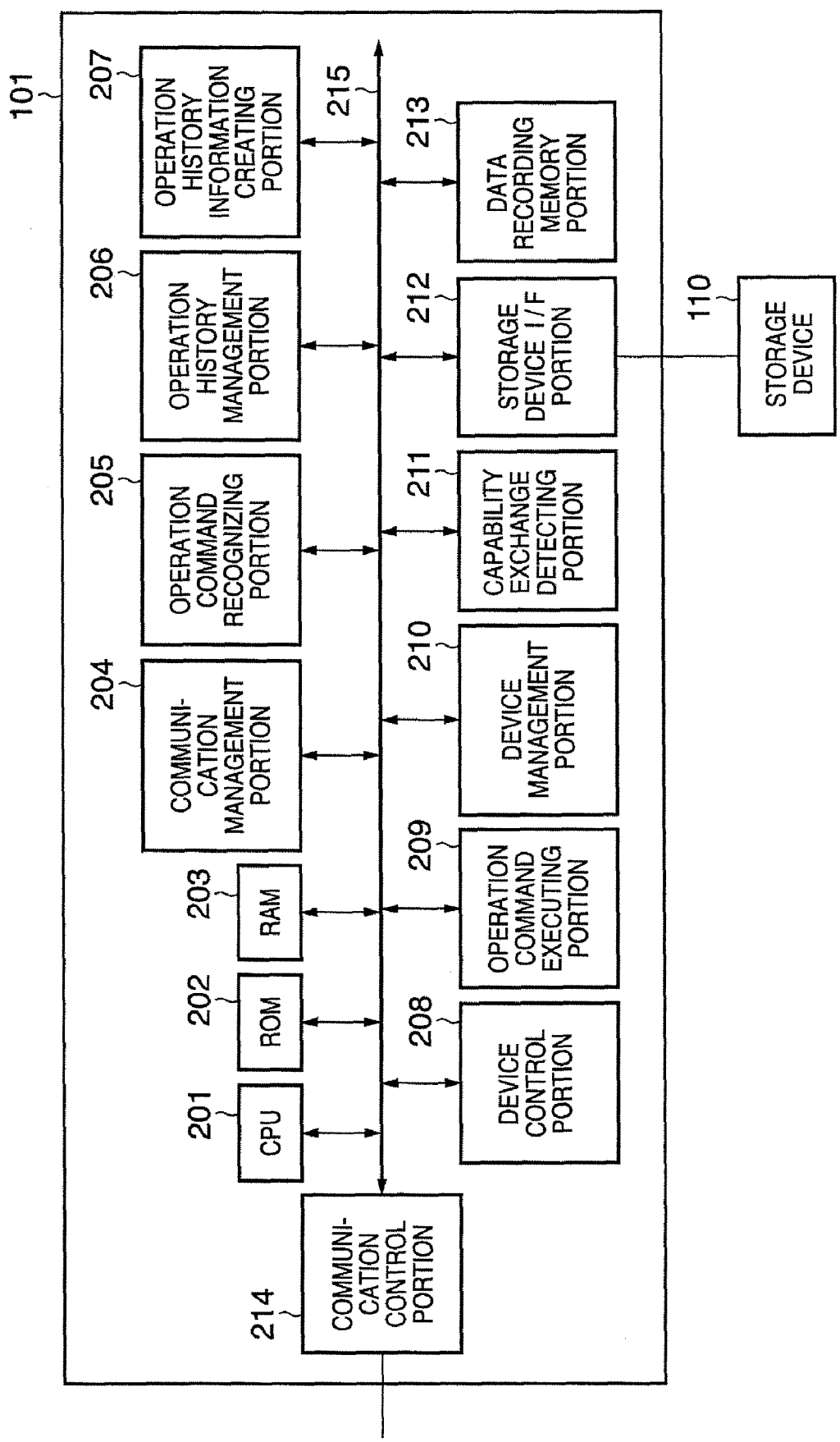
FIG. 2 is a diagram showing a hardware configuration of a wireless access point 101.

FIG. 2 is a diagram showing the hardware configuration of the wireless access point 101. As shown in FIG. 2, the wireless access point 101 includes a central control portion (CPU) 201, a ROM 202 and a RAM 203, which control the entire apparatus. The wireless access point 101 also includes a communication management portion 204 for managing communication links and a communication state among the devices and an operation command recognizing portion 205 for recognizing the operation command transmitted from the STB 102.

The wireless access point 101 further includes an operation history management portion 206 for managing operation history information created by an operation history information creating portion described later, an operation history information creating portion 207 for creating the operation history information and a device control portion 208 for transmitting a command to the devices according to the operation history information and exerting control. The wireless access point 101 further includes an operation command executing portion 209 for executing the operation command according to the operation history information and a device management portion 210 for managing the devices configuring the system and managing capabilities and resources of the devices.

The wireless access point 101 further includes a capability exchange detecting portion 211 for detecting the capabilities and resources of the devices configuring the system and a storage device I/F portion 212 for reading and writing the data from and to the portable storage device. The wireless access point 101 further includes a data recording memory portion 213 for temporarily recording the contents data delivered on the network and a communication control portion 214 for controlling the communication of the wireless LAN via a communication I/F not shown. The above-mentioned portions 201 to 214 are connected via an internal bus 215.

Figure 3:
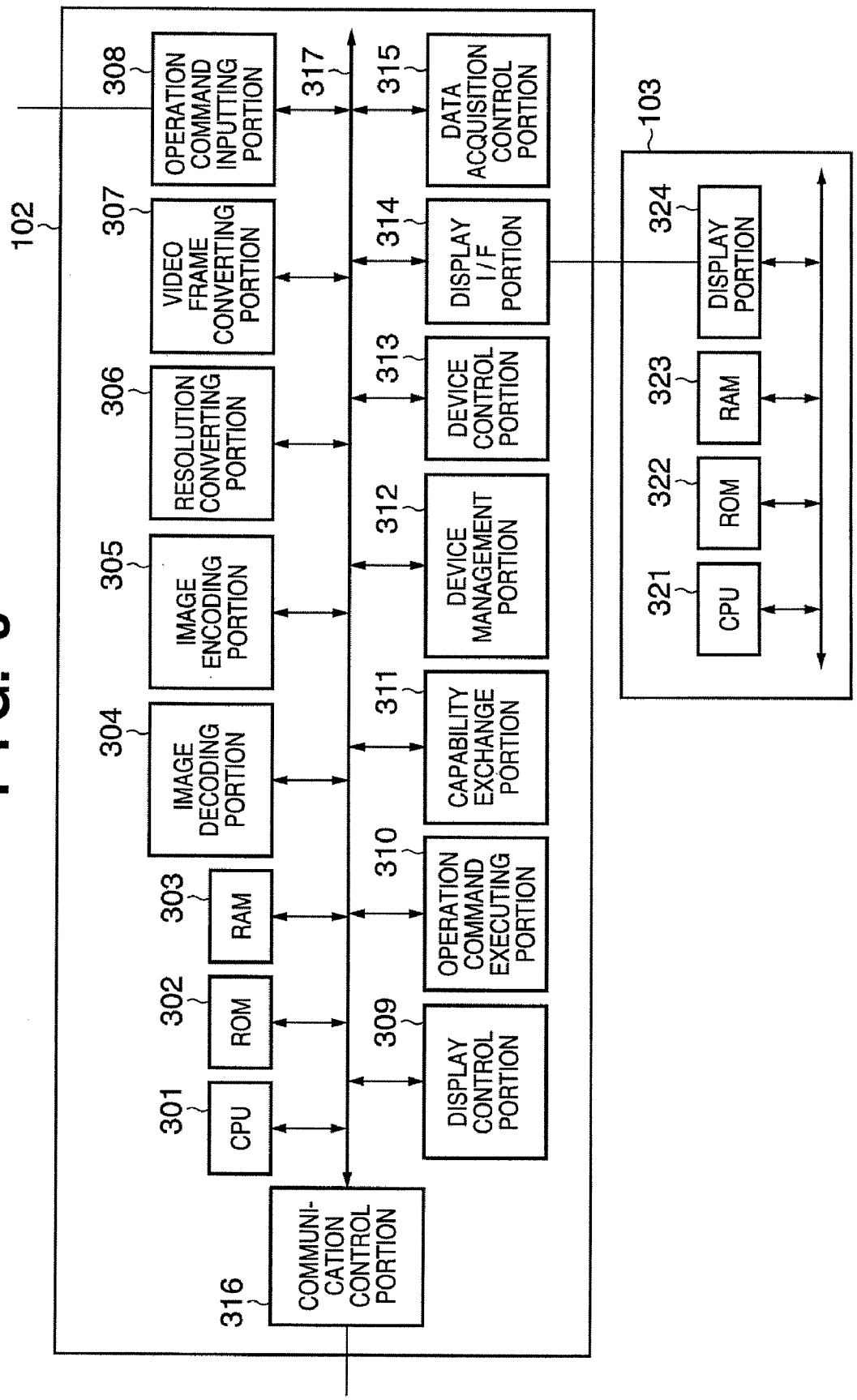
FIG. 3 is a diagram showing the hardware configuration of an STB 102 to which a display apparatus 103 is connected.

FIG. 3 is a diagram showing the hardware configuration of the STB 102 to which the display apparatus 103 is connected. As shown in FIG. 3, the STB 102 includes a central control portion (CPU) 301, a ROM 302 and a RAM 303, which control the entire STB. The STB 102 also includes an image decoding portion 304 for decoding the video data and image data such as JPEG and MPEG transmitted from the devices and an image encoding portion 305 for encoding the data decoded by the image decoding portion 304.

The STB 102 further includes a resolution converting portion 306 for converting the data decoded by the image decoding portion 304 to a size and a resolution for display and a video frame converting portion 307 for thinning a data display frame decoded by the image decoding portion 304 and converting a frame rate. The STB 102 further includes an operation command inputting portion 308 for inputting an operation command from the user, a display control portion 309 for controlling a display of the display apparatus 103 and an operation command executing portion 310 for executing the operation command according to the operation command from the operation command inputting portion 308.

The STB 102 further includes a capability exchange portion 311 for detecting the capabilities of the connected devices which are used when executed according to the operation command and a device management portion 312 for keeping the communication with the devices and the capabilities thereof. The STB 102 further includes a device control portion 313 for controlling the connected devices which are used when executed according to the operation command, and a display I/F portion 314 for controlling data display such as the contents, a list of the contents or a thumbnail for the display apparatus 103.

The STB 102 further includes a data acquisition control portion 315 for exerting control to acquire the data such as the contents and thumbnail from the devices and a communication control portion 316 for controlling the communication of the wireless LAN via the communication I/F not shown. The above-mentioned portions 301 to 316 are connected via an internal bus 317.

The display apparatus 103 includes a central control portion (CPU) 321, a ROM 322 and a RAM 323, which control the entire apparatus. The display apparatus 103 also includes a display portion 324 for displaying the data such as the contents and thumbnail, and provides capabilities such as high-resolution display and 2-screen display. The display apparatus 103 will be described by exemplifying the case of being connected to the STB 102. However, it goes without saying that the present invention is also applicable to the case where the STB 102 is included in the display apparatus 103 itself or the case where the STB 102 is stand-alone.

Figure 4:
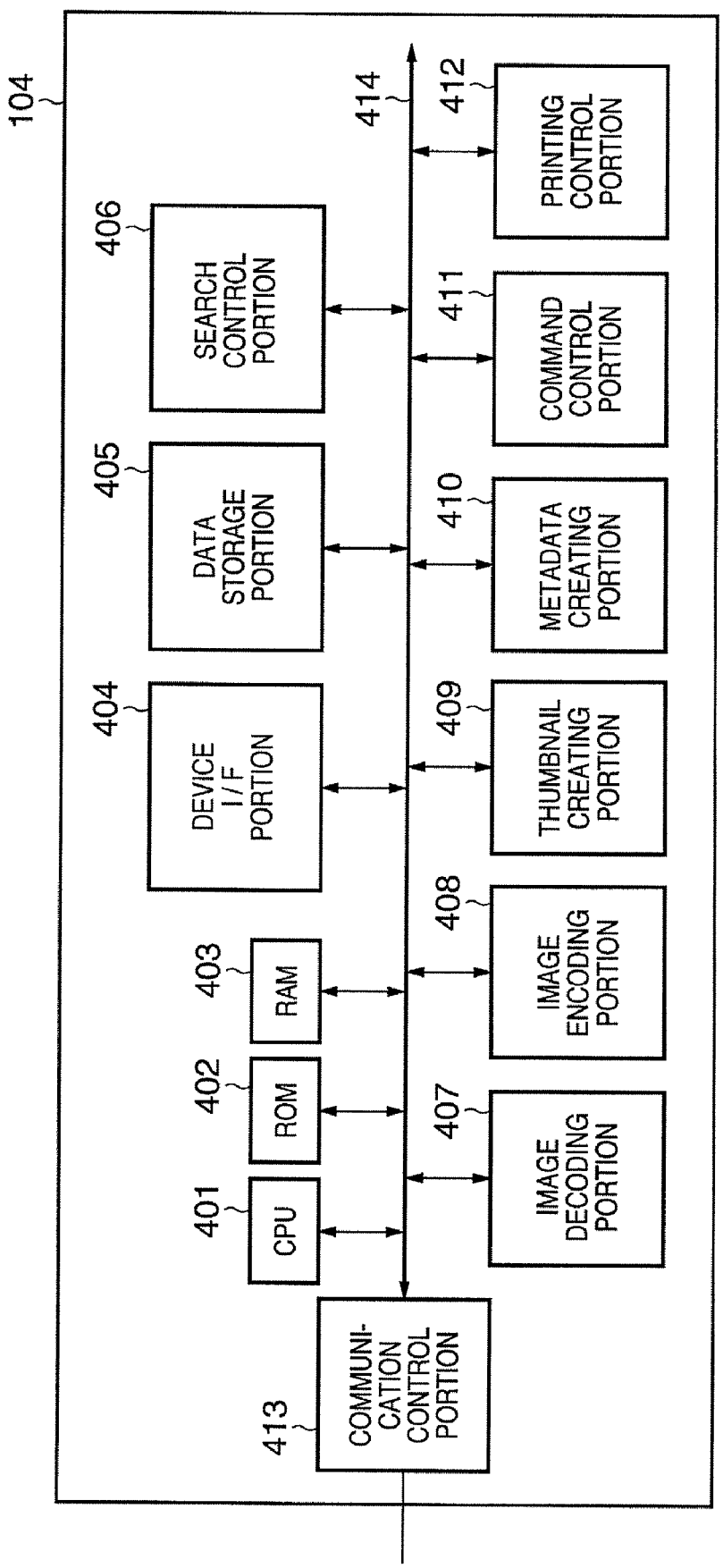
FIG. 4 is a diagram showing the hardware configuration of a storage apparatus 104.

FIG. 4 is a diagram showing the hardware configuration of the storage apparatus 104. As shown in FIG. 4, the storage apparatus 104 includes a central control portion (CPU) 401, a ROM 402 and a RAM 403, which control the entire apparatus. The storage apparatus 104 also includes a device I/F portion 404 such as a USB for acquiring the data from the devices, to which the printer apparatus 109 and the like are connected.

The storage apparatus 104 further includes a data storage portion 405 for recording the data from the devices and metadata such as the thumbnail when created and a search control portion 406 for searching stored data according to the operation command from the STB 102 and the like. The storage apparatus 104 further includes an image decoding portion 407 for decoding the video data and image data such as JPEG and MPEG acquired from the devices and an image encoding portion 408 for encoding the data decoded by the image decoding portion 407 for transmission.

The storage apparatus 104 further includes a thumbnail creating portion 409 for creating the thumbnail as the metadata for the data acquired from the devices, characterizing portion reproduction data and the like and a metadata creating portion 410 for creating detailed metadata for the data acquired from the devices and the like. The storage apparatus 104 further includes a command control portion 411 for transmitting and searching the contents data, contents list and metadata according to the operation command from the STB 102 and the like and a printing control portion 412 for controlling printing for the printer apparatus 109. The printing control portion 412 also provides the capabilities such as high-resolution printing and album printing, and also manages the resources of the printer apparatus 109.

The storage apparatus 104 further includes a communication control portion 413 for controlling the communication of the wireless LAN via the communication I/F not shown. The above-mentioned portions 401 to 413 are connected via an internal bus 414.

Figure 5:
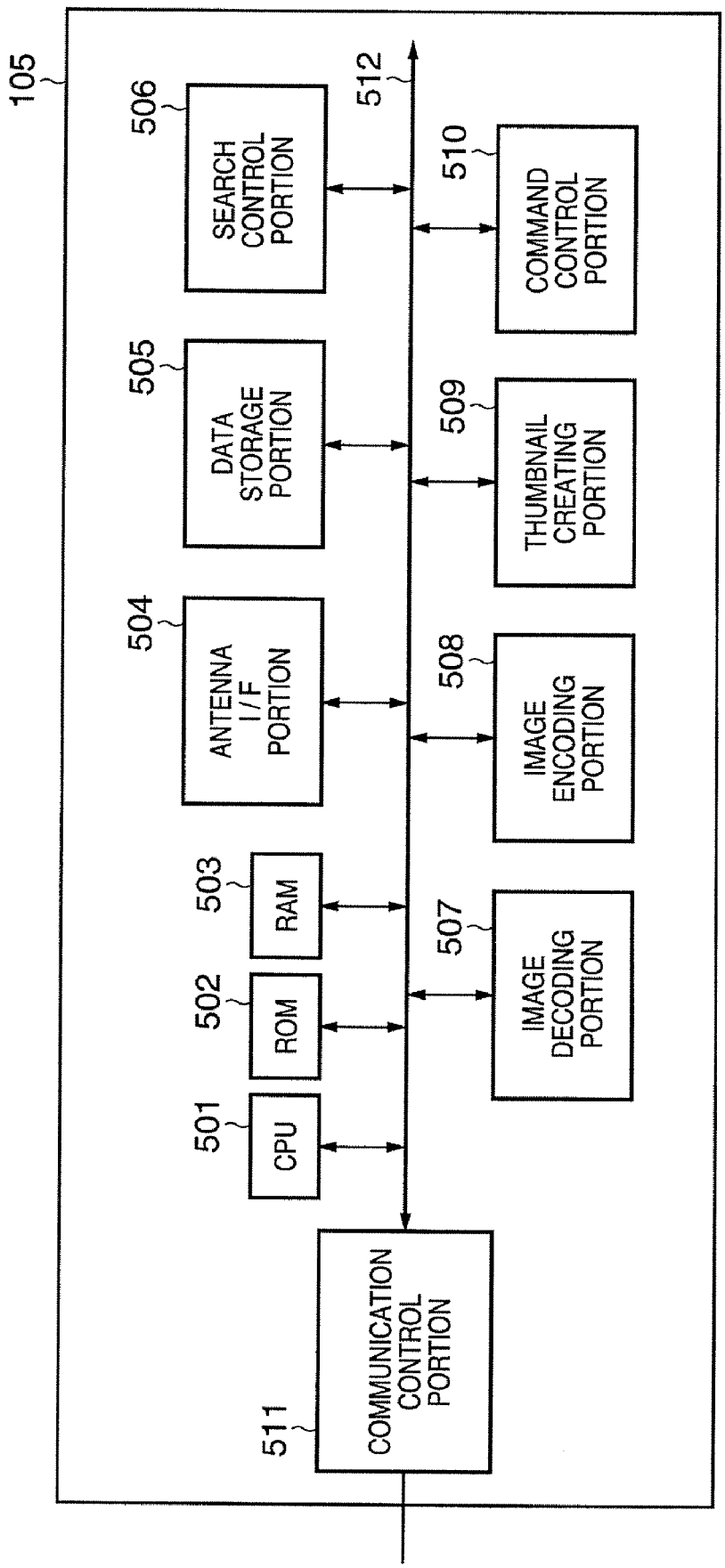
FIG. 5 is a diagram showing the hardware configuration of a broadcast contents recording and reproducing apparatus 105.

FIG. 5 is a diagram showing the hardware configuration of the broadcast contents recording and reproducing apparatus 105. As shown in FIG. 5, the broadcast contents recording and reproducing apparatus 105 includes a central control portion (CPU) 501, a ROM 502 and a RAM 503, which control the entire apparatus. The broadcast contents recording and reproducing apparatus 105 also comprises a tuner not shown, and includes an antenna I/F portion 504 connected to an antenna for receiving broadcast data and a data storage portion 505 for recording selected broadcast video data, broadcast metadata and the like.

The broadcast contents recording and reproducing apparatus 105 further includes a search control portion 506 for searching the stored data according to the operation command from the STB 102 and the like and an image decoding portion 507 for decoding the received broadcast video data such as MPEG. The broadcast contents recording and reproducing apparatus 105 further includes an image encoding portion 508 for encoding the data decoded by the image decoding portion 507 for transmission and a thumbnail creating portion 509 for creating the thumbnail, characterizing portion reproduction data and the like as the metadata for the received and selected broadcast video data.

The broadcast contents recording and reproducing apparatus 105 further includes a command control portion 510 for transmitting and searching the contents data, contents list and metadata according to the operation command from the STB 102 and the like and a communication control portion 511 for controlling the communication of the wireless LAN via the communication I/F not shown. The above-mentioned portions 501 to 511 are connected via an internal bus 512.

Figure 6:
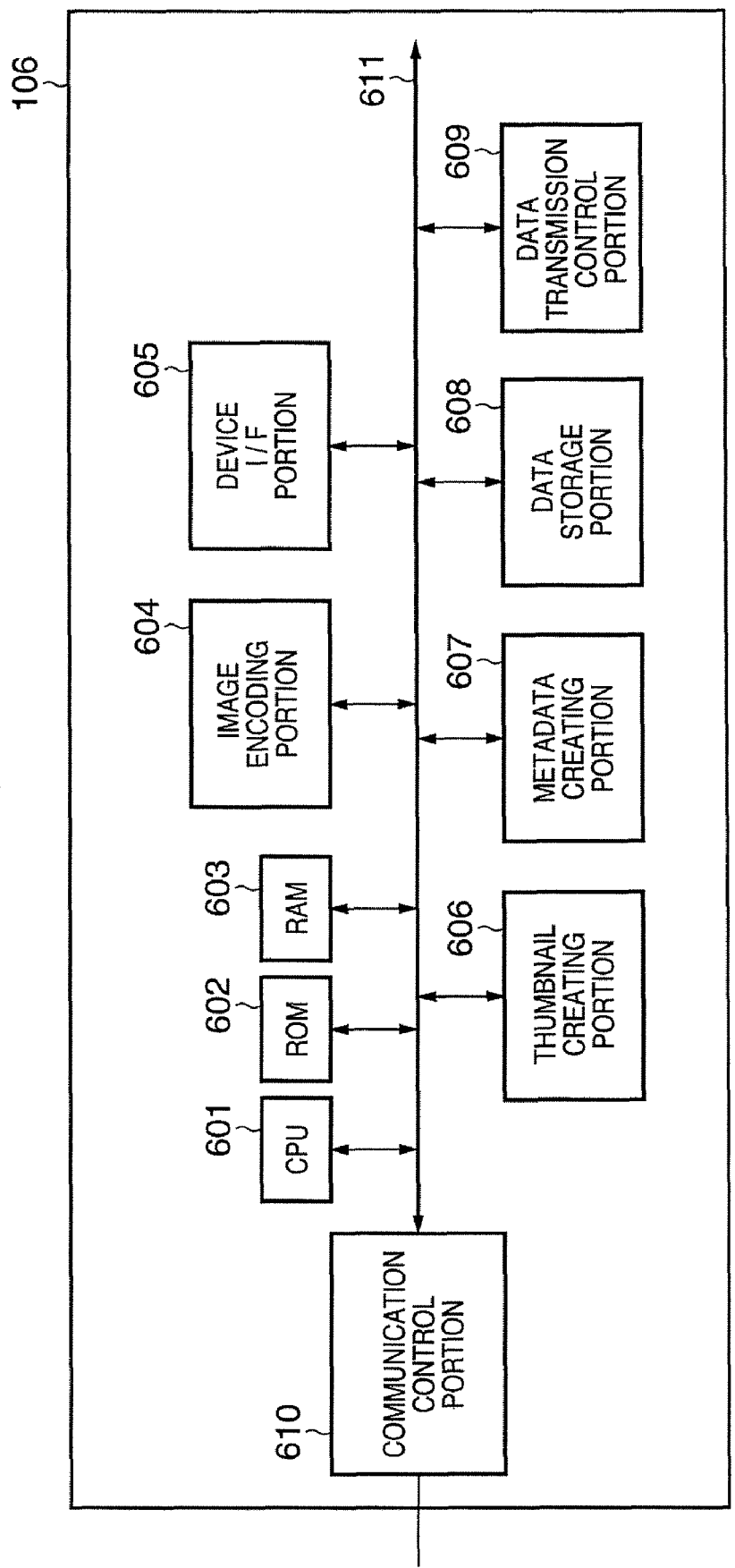
FIG. 6 is a diagram showing a basic hardware configuration of a camera apparatus 106.

FIG. 6 is a diagram showing the basic hardware configuration of the camera apparatus 106. As the configuration of the above-mentioned video shooting apparatus 107 and network camera apparatus 108 is the same as that of the camera apparatus 106, the camera apparatus 106 will be taken as an example and described here.

As shown in FIG. 6, the camera apparatus 106 includes a central control portion (CPU) 601, a ROM 602 and a RAM 603, which control the entire apparatus. The camera apparatus 106 also includes an image encoding portion 604 for encoding the contents data for transmitting it and a device I/F portion 605 such as a USB for acquiring the data from the other devices.

The camera apparatus 106 further includes a thumbnail creating portion 606 for creating the thumbnail as the metadata for the data acquired from the devices, characterizing portion reproduction data and the like and a metadata creating portion 607 for creating detailed metadata for the data acquired from the devices and the like. The camera apparatus 106 further includes a data storage portion 608 for temporarily storing the data from the devices and storing the metadata such as the thumbnail when created.

The camera apparatus 106 further includes a data transmission control portion 609 for transmitting the contents data, contents list and metadata to the display apparatus 103, storage apparatus 104 and the like according to the operation command from the STB 102 and the like. The camera apparatus 106 further includes a communication control portion 610 for controlling the communication of the wireless LAN via the communication I/F not shown. The above-mentioned portions 601 to 610 are connected via an internal bus 611.

Figure 7:
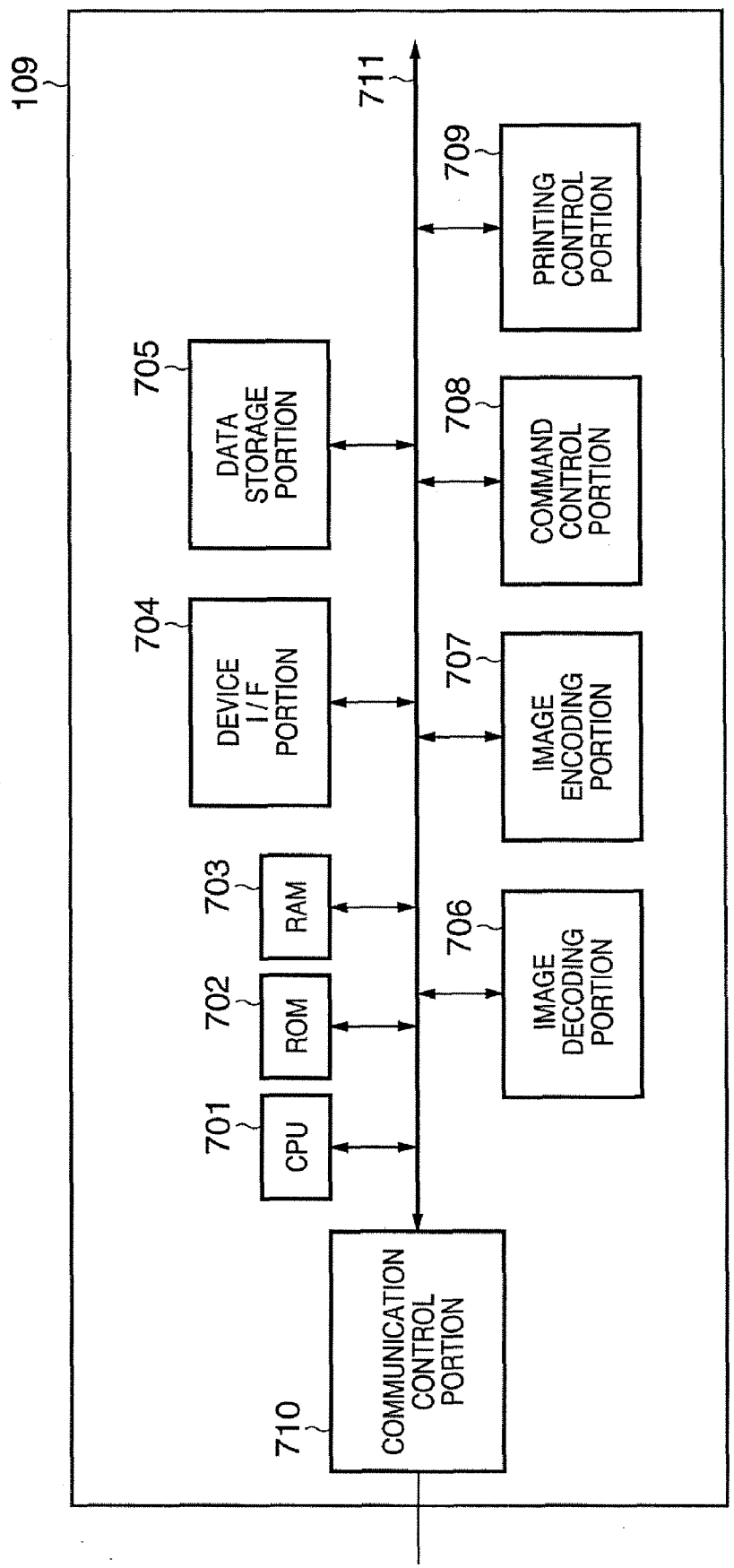
FIG. 7 is a diagram showing the hardware configuration of a printer apparatus 109.

FIG. 7 is a diagram showing the hardware configuration of the printer apparatus 109. As shown in FIG. 7, the printer apparatus 109 includes a central control portion (CPU) 701, a ROM 702 and a RAM 703, which control the entire apparatus. The printer apparatus 109 also includes a device I/F portion 704 such as a USB for acquiring the data from the devices, to which a personal computer and the like are connected.

The printer apparatus 109 further includes a data storage portion 705 for recording the data from the devices and metadata such as the thumbnail transmitted from the devices and an image decoding portion 706 for decoding the video data and image data such as JPEG and MPEG acquired from the devices. The printer apparatus 109 further includes an image encoding portion 707 for encoding the data decoded by the image decoding portion 706 for transmission and a command control portion 708 for transmitting and searching the contents data, contents list and metadata according to the operation command from the STB 102 and the like.

The printer apparatus 109 further includes a printing control portion 709 for controlling printing for a printer engine, and the printer engine manages the capabilities such as high-resolution printing and album printing and the resources of the printer engine. The printer apparatus 109 further includes a communication control portion 710 for controlling the communication of the wireless LAN via the communication I/F not shown. The above-mentioned portions 701 to 710 are connected via an internal bus 711.

The storage apparatus 104 of this embodiment does not have the capability for creating the thumbnail and metadata of the videos, images and the like and the capability for searching by using them.

As for the above configuration, a description will be given as a list of the operation contents and the operation history recorded by the storage device 110 of the wireless access point 101. First, the list of the operation contents will be described by using FIG. 8.

FIG. 8 is a diagram showing the list representing operation contents of the user. The entire list consists of the operation contents inputted by the user from the operation command inputting portion 308 of the STB 102. The list is displayed on the display apparatus 103, where the operation is executed by selecting it.

An operation 1 is the operation whereby broadcast video contents recorded in the broadcast contents recording and reproducing apparatus 105 are searched for and delivered to the display apparatus 103 to be displayed thereon. An operation 2 is the operation whereby the broadcast video contents recorded in the broadcast contents recording and reproducing apparatus 105 and a static image recorded in the camera apparatus 106 are delivered to the display apparatus 103 to be simultaneously displayed on two screens.

An operation 3 is the operation whereby the static image recorded in the camera apparatus 106 is delivered to the display apparatus 103 and displayed thereon and then the video recorded in the video shooting apparatus 107 is delivered to the display apparatus 103 and displayed thereon. An operation 4 is the operation whereby the static image recorded in the camera apparatus 106 is delivered to the storage apparatus 104 and stored therein to be printed by the printer apparatus 109.

An operation 5 is the operation whereby a moving image is shot by the network camera apparatus 108 and transmitted to the display apparatus 103 by video streaming distribution to be displayed thereon. An operation 6 is the operation whereby the video recorded in the video shooting apparatus 107 is delivered to the display apparatus 103 and reproduced thereon and in timing of having reproduced it for 2 minutes and 30 seconds, the static image recorded in the camera apparatus 106 is acquired to be simultaneously displayed on the two screens.

An operation 7 is the operation whereby the video shot in the video shooting apparatus 107 is simultaneously delivered to the display apparatus 103 and storage apparatus 104 and stored in the storage apparatus 104 while displaying it on the display apparatus 103. An operation 8 is the operation whereby a low-resolution video is shot by the video shooting apparatus 107 and delivered to the display apparatus 103 to be displayed thereon.

An operation 9 is the operation whereby a high-resolution video is shot by the video shooting apparatus 107 and delivered to the display apparatus 103 to be displayed thereon. An operation 10 is the operation whereby the contents with favorite tag metadata stored in the storage apparatus 104 are searched for, which are delivered to the display apparatus 103 to be displayed thereon.

FIGS. 9A and 9B are diagrams showing the configuration of an operation history table. This table is recorded in the storage device 110 of the wireless access point 101. As shown in FIGS. 9A and 9B, those recorded in the storage device 110 are the operation command transmitted to the devices via the input and network when each of the operations is performed, the devices used for the operation and the capabilities of the devices used for the operation. In the case where the operation is performed by the operation command related to original contents, the contents used for the operation are recorded in the storage device 110 and added to the operation history table.

For instance, the operations 2, 3 and 6 shown in FIGS. 9A and 9B are the operations related to the contents, where an outline of the contents is recorded in the operation history table. The operations 1, 4, 5, 7, 8, 9 and 10 are intended for movement of the operations only unrelated to the contents so that the outline of the contents is not recorded in the operation history table. In the case where the contents are moved, operation command information plays a role of a play list for reproducing the contents.

Next, a description will be given by using FIGS. 10A and 10B as to the table for managing a capability usage state of the multiple devices connected to the network by system.

FIGS. 10A and 10B are diagrams showing an example of the configuration of a device status management table which is managed by system. The management table is recorded in the device management portion 210 of the wireless access point 101. FIG. 10A is the device status management table of a system 1, and FIG. 10B is the device status management table of a system 2. Both FIGS. 10A and 10B have the connected devices, their capabilities, usage state and reservation state recorded therein.

The system 1 is connected with the wireless access point 101, STB 102, display apparatus 103, broadcast contents recording and reproducing apparatus 105, camera apparatus 106, video shooting apparatus 107, storage apparatus 104, network camera apparatus 108 and printer apparatus 109. As for the capabilities of the devices, the wireless access point 101 has the capabilities such as operation history recording and device access, and the STB 102 has the capabilities such as user operation input, image encoding and decoding. The display apparatus 103 has the capabilities such as high-resolution display and 2-screen display, and the broadcast contents recording and reproducing apparatus 105 has the capabilities such as the storage, delivery and search of the broadcast contents. The camera apparatus 106 has the capabilities such as static image shooting, low-resolution moving image shooting and data distribution, and the video shooting apparatus 107 has the capabilities such as high-resolution moving image shooting and data distribution. The storage apparatus 104 has the capabilities such as the storage, delivery, search and printing of the contents, and the network camera apparatus 108 has the capabilities such as high-resolution video shooting and streaming distribution. And the printer apparatus 109 has a printing capability. These are recorded together with the usage state and reservation information about the devices.

The system 2 is connected with the wireless access point 101, STB 102, display apparatus 103, broadcast contents recording and reproducing apparatus 105, camera apparatus 106, video shooting apparatus 107 and a PC. As for the capabilities of the devices, the wireless access point 101 has the capabilities such as operation history recording and device access, and the STB 102 has the capabilities such as user operation input and image encoding and decoding. The display apparatus 103 has the capability such as high-resolution display, and the broadcast contents recording and reproducing apparatus 105 has the capabilities such as the storage, delivery and search of the broadcast contents. The camera apparatus 106 has the capabilities such as static image shooting, low-resolution moving image shooting and data distribution. The video shooting apparatus 107 has the capabilities such as high-resolution moving image shooting and data distribution, and the PC has the capabilities such as the storage, delivery and printing of the contents. These are recorded together with the usage state and reservation state of the devices.

(Detailed Description of the Actions)

Here, concrete processing of this embodiment will be described by dividing it into several cases with reference to FIGS. 11 to 19. First, a description will be given by using FIGS. 11 to 13 as to a recording process of the operation history, as an example of the operations, performed by the wireless access point 101 when the operations 6 and 10 shown in FIG. 8 are performed from the STB 102.

Figure 11:
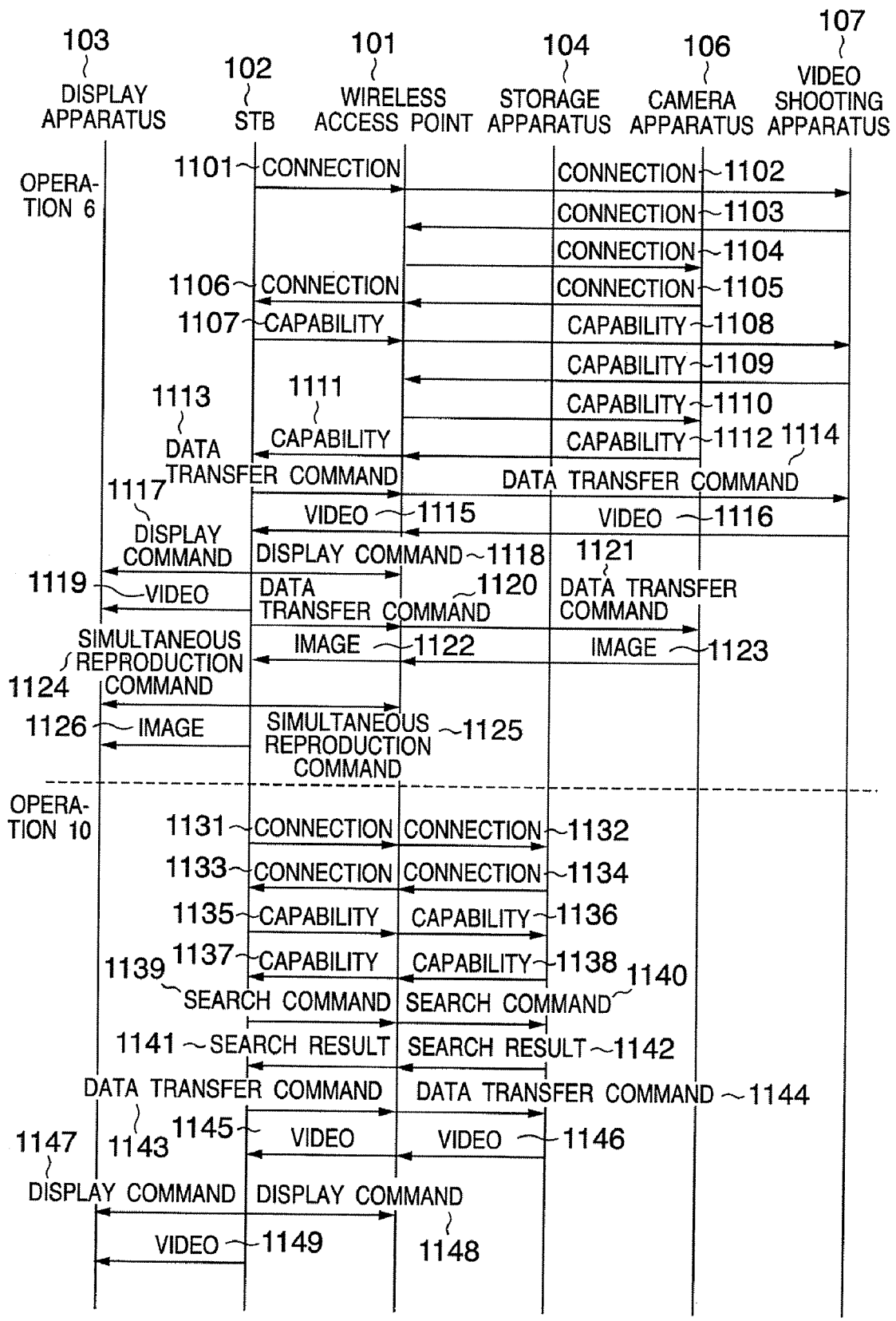
FIG. 11 is a diagram showing communication sequences among devices in operations 6 and 10.
Figure 12:
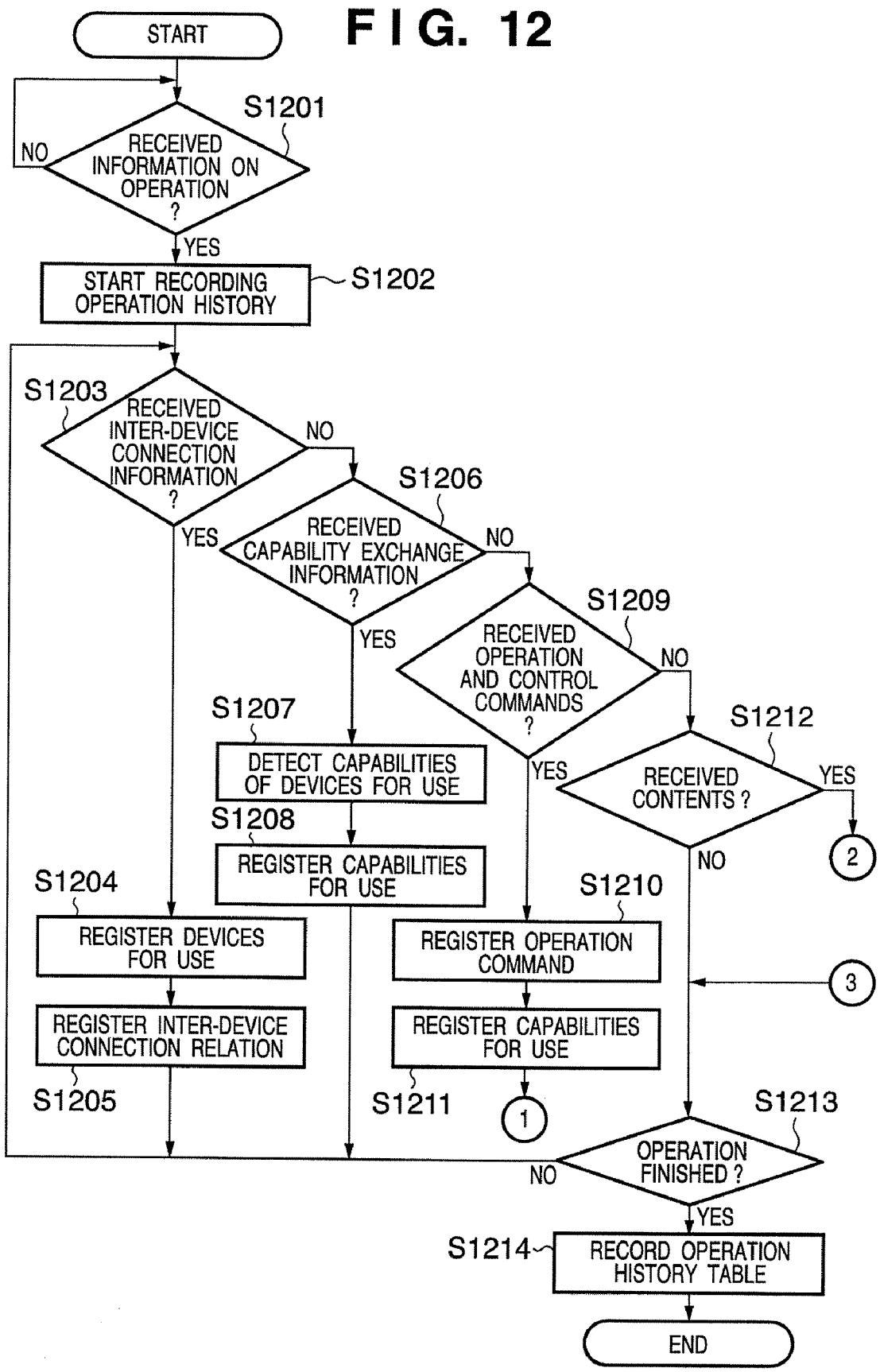
FIG. 12 is a flowchart showing an operation history recording process according to this embodiment.

FIG. 11 is a diagram showing communication sequences among the devices in the operations 6 and 10. FIG. 12 is a flowchart showing the operation history recording process according to this embodiment. First, if the operation command is inputted from the operation command inputting portion 308 of STB 102 and the operation is started, the information on the operation is transmitted from the STB 102 to the wireless access point 101 (S1201). Thus, a region of new operation command history data is created by the operation history management portion 206 of the wireless access point 101, and the recording process of the operation history is started by the operation history information creating portion 207 (S1202). The region of the operation command history data is the region of the data registered as the operation 6 with the operation history table shown in FIGS. 9A and 9B for instance.

Here, in the case where the wireless access point 101 receives inter-device connection information (1101) from the STB 102 (YES in S1203), it transmits connection request information (1102, 1104) to the video shooting apparatus 107 and camera apparatus 106. As this example is the operation 6, the video shooting apparatus 107 and camera apparatus 106 are designated as connected devices. Thus, the device management portion 210 registers the video shooting apparatus 107 and camera apparatus 106 as the devices for use with the device status management table (S1204). Thereafter, it analyzes connection response information (1103, 1105) from the video shooting apparatus 107 and camera apparatus 106, and registers an inter-device connection relation of the devices for use with the device status management table (S1205).

Next, if the wireless access point 101 receives capability exchange information (1107) from the STB 102 (YES in S1206), it transmits capability request information (1108, 1110) to the video shooting apparatus 107 and camera apparatus 106. Thereafter, if it receives capability response information (1109, 1112) from the video shooting apparatus 107 and camera apparatus 106, the capability exchange detecting portion 211 detects the capabilities of the devices for use (S1207). And the device management portion 210 registers the capabilities of the devices for use with the device status management table (S1208).

Next, if the wireless access point 101 receives the operation and control commands from the STB 102 (YES in S1209), the operation command recognizing portion 205 recognizes the received commands and analyzes the capabilities for use of the devices in that case. And the operation history information creating portion 207 registers the operation command with the operation history table (S1210), and further registers the used capabilities of the devices with the operation history table (S1211). In this example, the above-mentioned operation command and capabilities for use are registered with the operation history table as the operation command history data of the operation 6. The processing thereafter will be further described by using FIG. 13 later.

If the wireless access point 101 receives the contents (YES in S1212), it performs a contents collection process shown in FIG. 13 described later. If the wireless access point 101 receives any other information (NO in S1212), it determines whether or not the operation is finished. If the operation is not finished (No in S1213), it repeats the processing from S1203 onward. If the operation is finished thereafter (YES in S1213), the operation history information creating portion 207 records the created operation history table in the storage device 110 (S1214).

Figure 13:
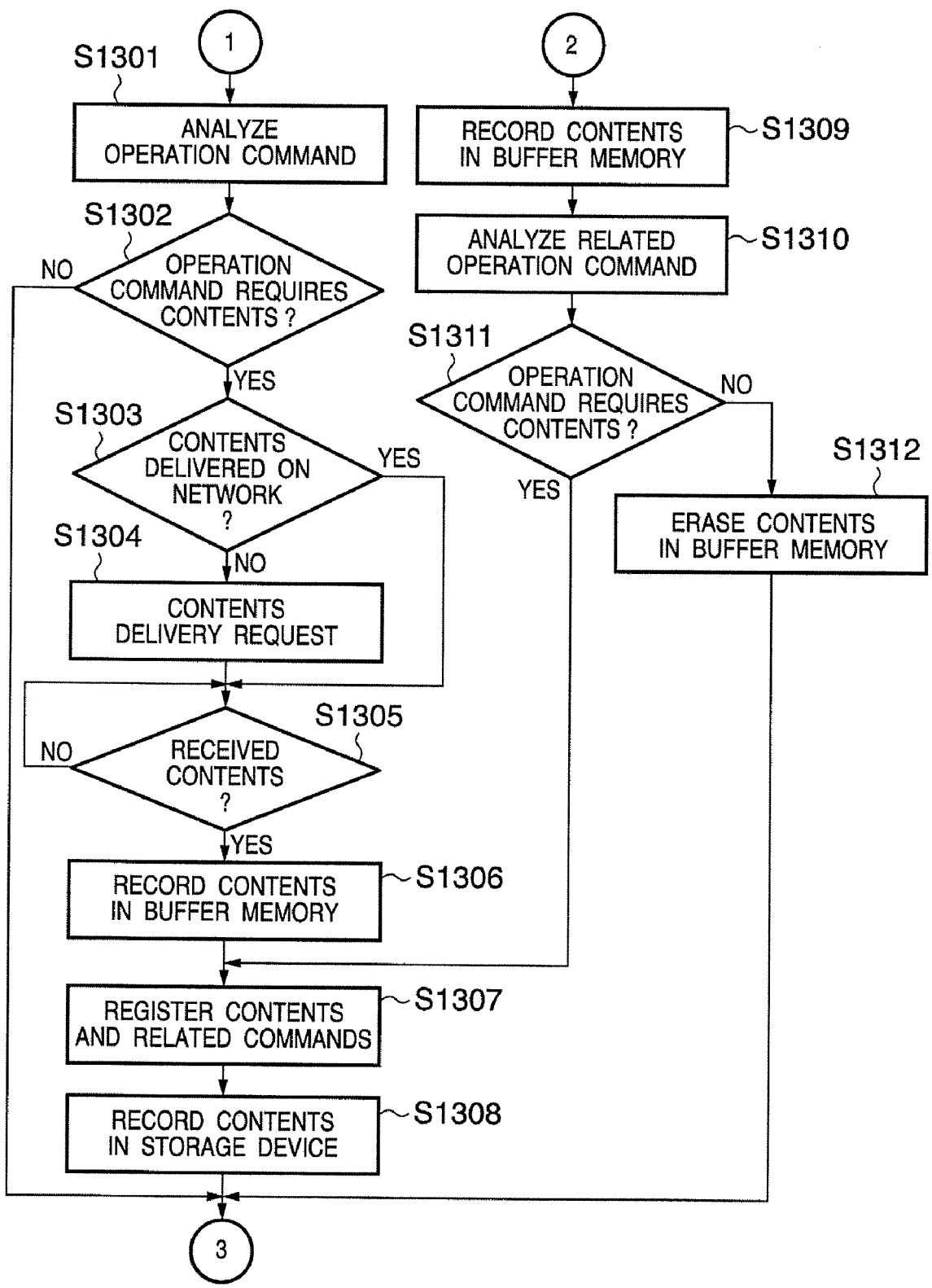
FIG. 13 is a flowchart showing a contents collection process according to this embodiment.

FIG. 13 is a flowchart showing the contents collection process according to this embodiment. First, when receiving and registering the above-mentioned operation and control commands (S1211), the operation command recognizing portion 205 analyzes the operation command (S1301). Here, in the case where the contents to be transferred is necessary as with a data transfer command (1113) (YES in S1302), it analyzes whether or not the contents are delivered on the network. Consequently, if not delivered (NO in S1303), a delivery request is made to the device having the contents to be able to receive the contents (S1304).

In the example of FIG. 11, the data transfer command (1114) is transmitted to the video shooting apparatus 107, and a video (1116) received from the video shooting apparatus 107 is transferred as a video (1115) to the STB 102.

In the case where the contents are delivered to another device by the operation as with the video (1116) and an image (1123), the contents are received (YES in S1305) and recorded in a buffer memory (S1306). And the operation history information creating portion 207 registers the contents and related commands with the operation history table (S1307). And it records the contents in the storage device 110 (S1308).

In the example of FIG. 11, the wireless access point 101 receives a display command (1118), a data transfer command (1120) and a simultaneous reproduction command (1125) from the STB 102. The wireless access point 101 transmits a data transfer command (1121) to the camera apparatus 106, and transfers the image (1123) received from the camera apparatus 106 as an image (1122) to the STB 102. The STB 102 transmits a display command (1117) and a simultaneous reproduction command (1124) to the display apparatus 103, and transfers a video (1119) and an image (1126) to the display apparatus 103.

In the case where the operation of searching for the contents of the storage apparatus and reproducing them on the display apparatus is performed on the STB 102 as with the operation 10, the contents data is not stored if the contents to be transferred is not necessary (NO in S1302). In this example, the contents data is not stored in the case where the contents to be transferred changes each time, such as transferring a video (1146) of a search result.

In the case where the above-mentioned contents are received (YES in S1212), the data is recorded in the data recording memory portion 213 (S1309), and the operation history management portion 206 analyzes the operation command related to the data (S1310). Here, in the case where the operation command requires the contents data (YES in S1311), the operation history information creating portion 207 registers the contents and related commands with the operation history table (S1307). And it records the contents with the storage device 110 (S1308). It erases the contents data recorded in the data recording memory portion 213 (S1312) in the case where the operation command does not require the contents data (NO in S1311).

The communication sequences (1131 to 1149) among the devices in the operation 10 are the same as those in the operation 6 shown in FIG. 11, and so detailed description thereof will be omitted.

Figure 14:
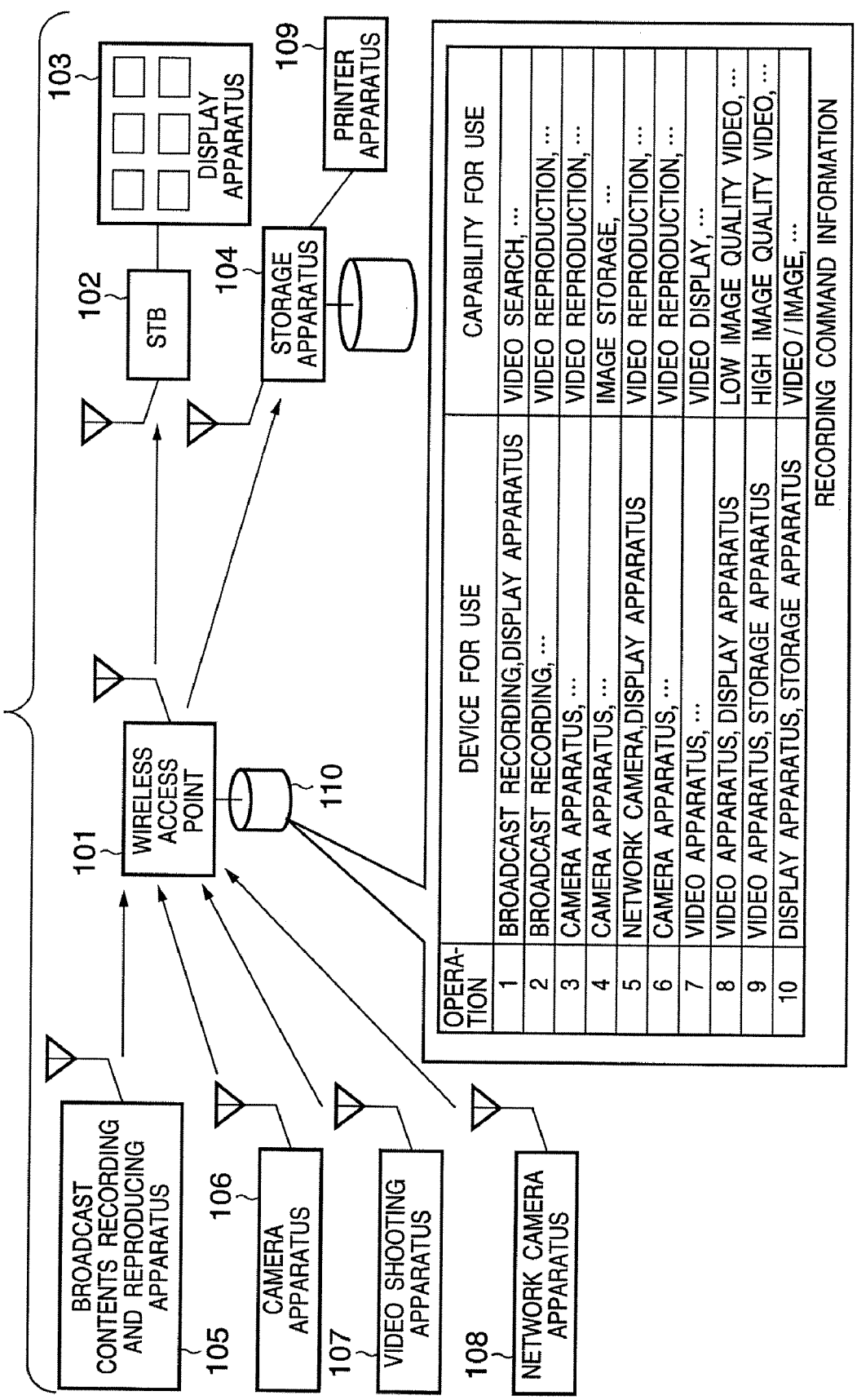
FIG. 14 is a diagram showing recording command information created as operation command history data in a system 1.

FIG. 14 is a diagram showing recording command information created as the operation command history data in the system 1. The recording command information is recorded in the storage device 110 of the wireless access point 101, and can be shown as a list on the display apparatus 103 as shown in FIG. 14. And the user can reproduce the same action by selecting a desired operation from a displayed list.

Thus, the system 1 creates and records the operation command history data and another system acquires the history data so that the other system can easily reproduce the same action and reproduce, view and print the contents effectively.

Next, a description will be given by using FIGS. 15 to 17 as to the processing of transferring the recording command information created by the system 1 to the system 2, automatically determining whether or not the same action is possible in the system 2 and presenting only an operable command to the user. The recording command information is transferred by moving the storage device 110 from the system 1 to the system 2 shown in FIG. 10B.

Figure 15:
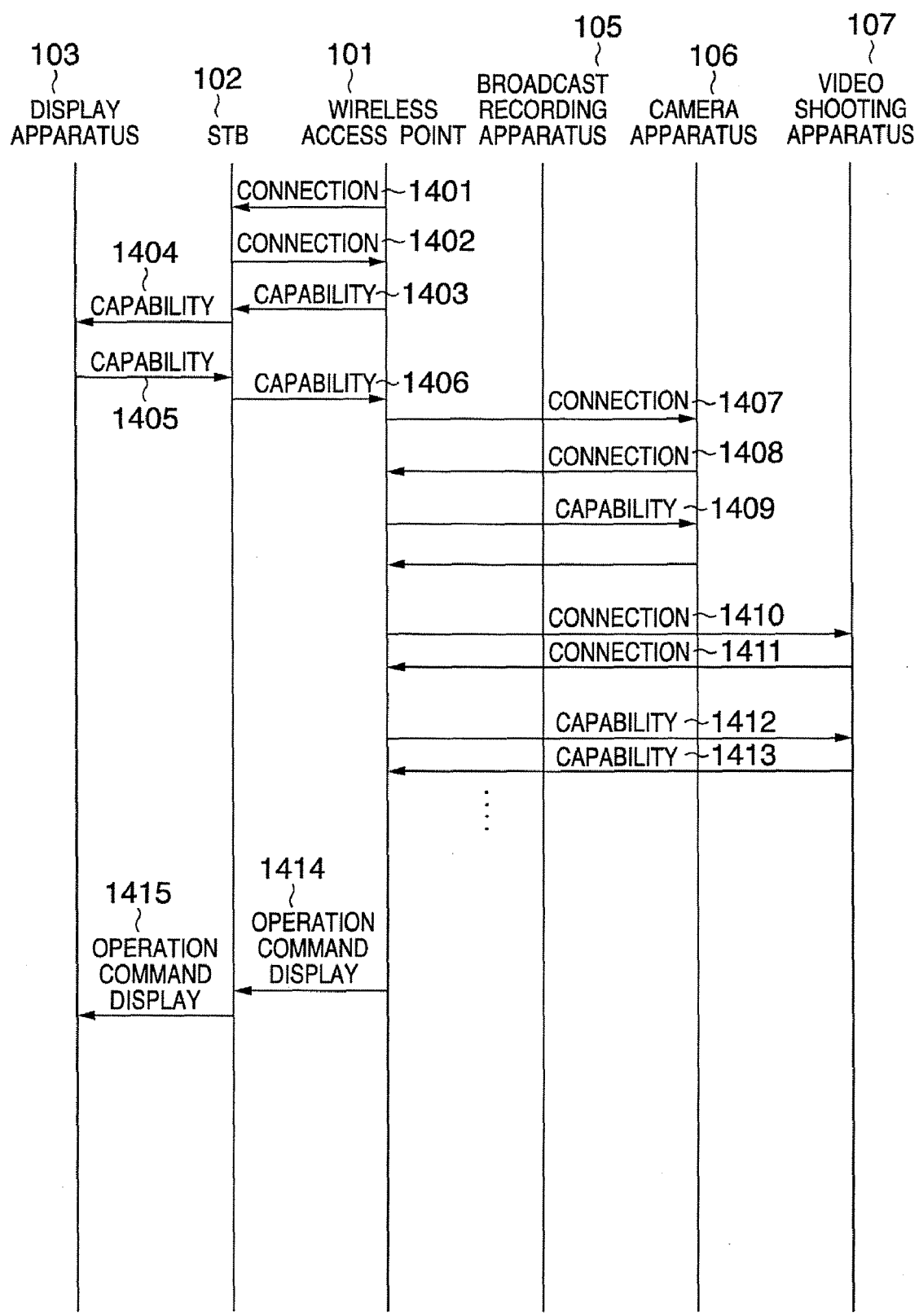
FIG. 15 is a diagram showing the communication sequences among the devices when transferring the recording command information to a system 2.
Figure 16:
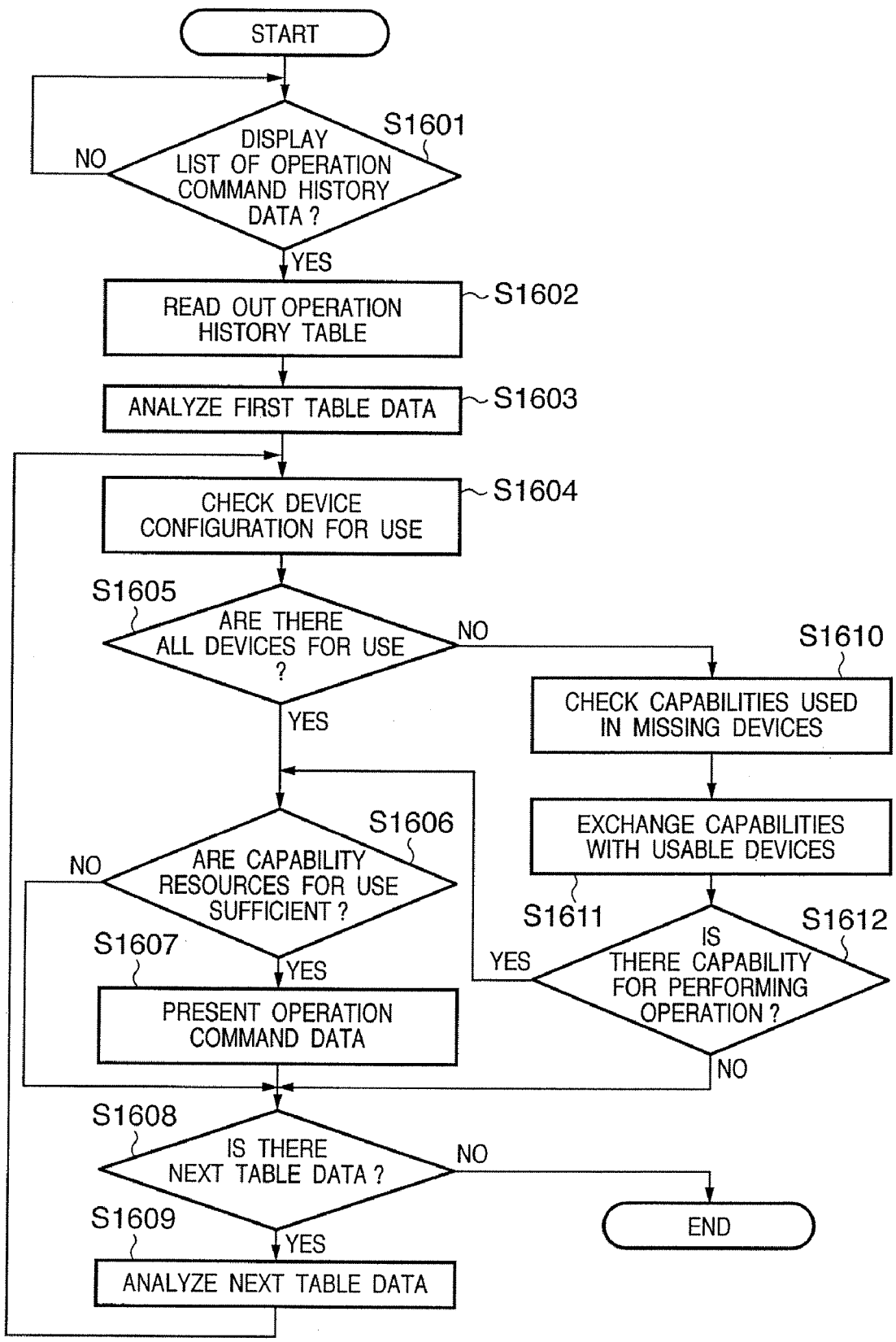
FIG. 16 is a flowchart showing a presentation process of the operation command history data.

FIG. 15 is a diagram showing the communication sequences among the devices when transferring the recording command information to the system 2. FIG. 16 is a flowchart showing a presentation process of the operation command history data. First, if the operation command inputting portion 308 of STB 102 orders a list display of the operation command history data (S1601), the operation history table (FIGS. 9A and 9B) is read out of the storage device 110 (S1602). And the operation history management portion 206 starts a data analysis of the operation history table (S1603). According to a result of the analysis, the operation history management portion 206 transmits connection commands (1401, 1407 and so on) and connects with the devices for use so as to check device configuration for use (S1604).

Next, in the case where there are all the devices to be used for the operation command history data (YES in S1605), the device management portion 210 transmits a capability exchange command (1403, 1409 or the like) to check whether or not capability resources for use are sufficient (S1606). Consequently, if sufficient, it transmits an operation command display command (1414) to display the recording command information shown in FIG. 17 (S1607). It examines whether or not there is next data in the operation history table (S1608). If there is, the operation history management portion 206 analyzes the next data (S1609) so as to return to the above-mentioned process (S1604).

In the case where there are not all the devices to be used for the operation command history data (NO in S1605), the operation history management portion 206 analyzes the operation history table to check the capabilities used in the missing devices (S1610). Next, the device management portion 210 performs capability exchange with the devices usable in the system 2 (S1611), and determines whether or not the capability for performing the operation exists in the system (S1612). Here, if it exists, the device management portion 210 checks whether or not the capability resources for use are sufficient (S1606) with the capability exchange command (1403, 1409 or the like). Consequently, if sufficient, it transmits the operation command display command (1414) to display the recording command information shown in FIG. 17 (S1607).

In the above-mentioned S1606 or S1612, the recording command information is not displayed as to the operation of the operation history table having no execution capability and resources therefor.

Figure 17:
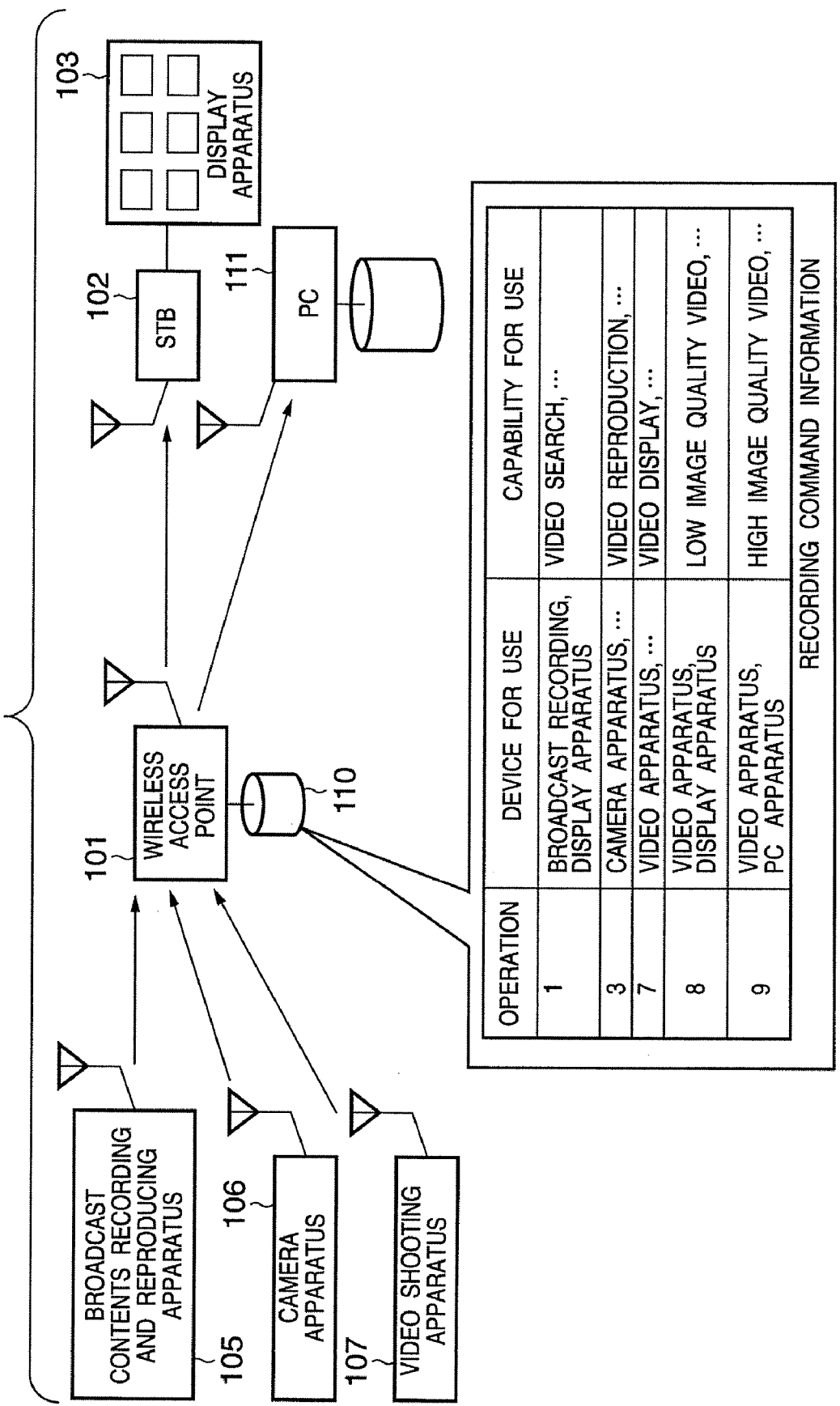
FIG. 17 is a diagram showing the recording command information in the system 2.

FIG. 17 is a diagram showing the recording command information in the system 2. It is the recording command information presented on removing the storage device 110 from the system 1 and mounting it on the system 2. Here, the display apparatus 103 displays as a list the ones determined to be executable from the devices and capabilities for use of the device status management table of the system 2 and the operation history table recorded in the storage device 110. And the user selects a desired operation from the list so as to reproduce the same action.

Thus, it is possible to recognize what operation can or cannot be performed before actually performing that operation and specify a desired operation simply. It is also possible to prevent the operation from becoming irreproducible halfway through the action after performing the operation.

Figure 18:
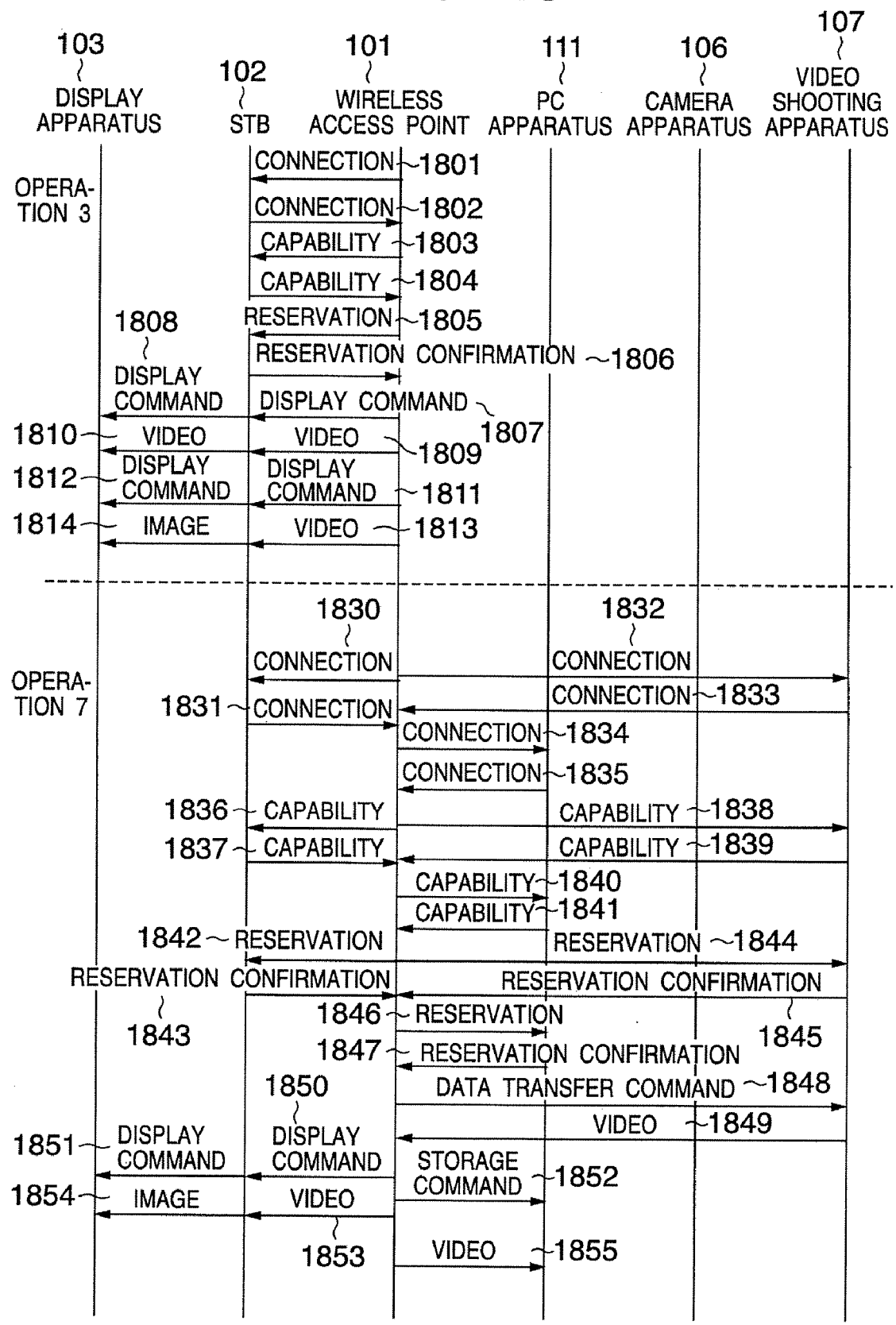
FIG. 18 is a diagram showing the communication sequences among the devices in operations 3 and 7 when executing the operation command history data in the system 2.
Figure 19:
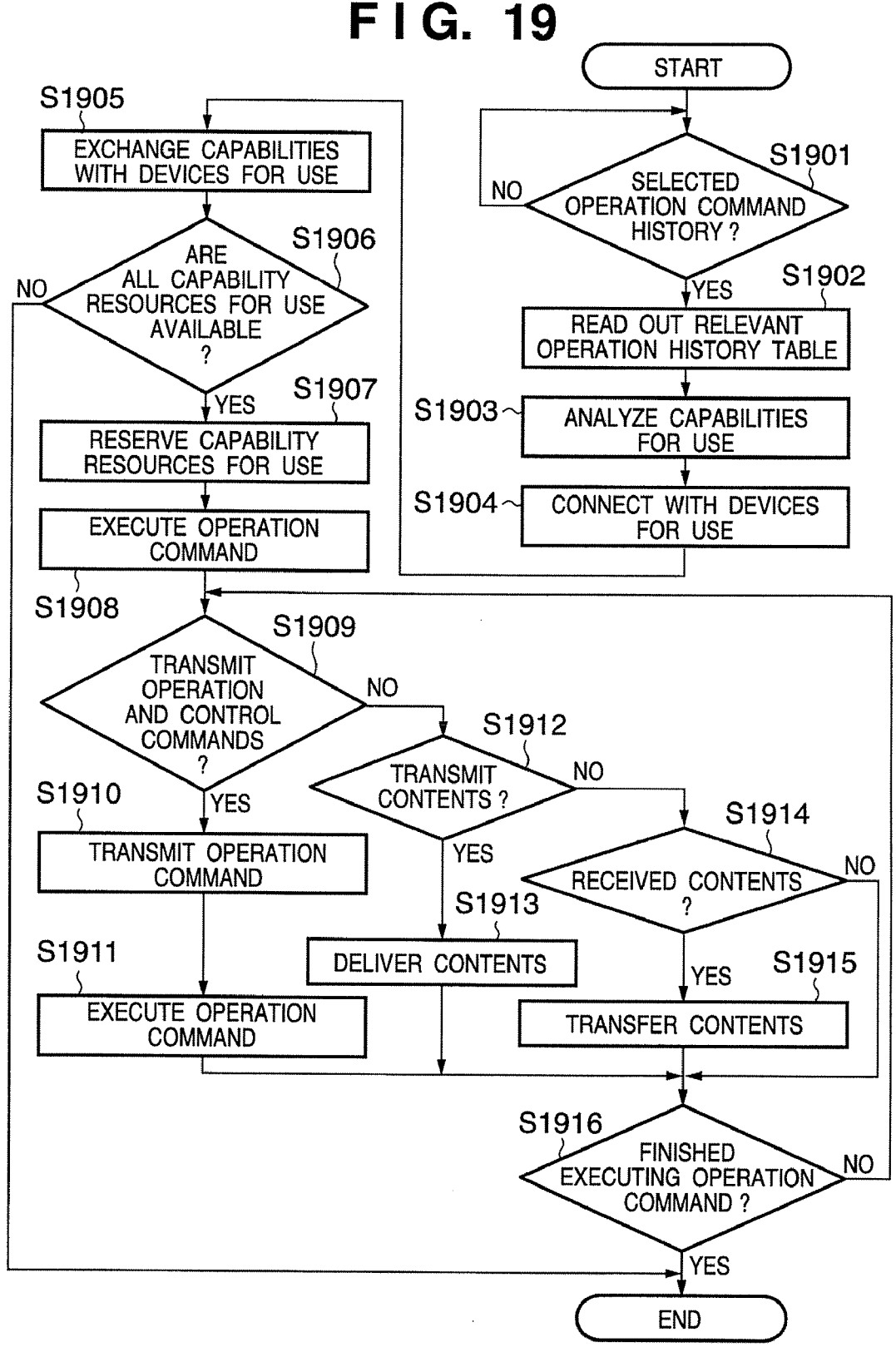
FIG. 19 is a flowchart showing a process of executing the operation command history data.

FIG. 18 is a diagram showing the communication sequences among the devices in the operations 3 and 7 when executing the operation command history data in the system 2. FIG. 19 is a flowchart showing the process of executing the operation command history data. First, if a desired operation is selected out of the recording command information shown in FIG. 17 from the operation command inputting portion 308 of the STB 102 (S1901), the wireless access point 101 reads out the data of the operation history table shown in FIGS. 9A and 9B from the storage device 110 (S1902). Next, the operation command executing portion 209 analyzes the capabilities of the devices for use (S1903), and transmits connection commands (1801 in the operation 3, 1830, 1832 and 1834 in the operation 7) and connects with the devices for use (S1904).

Next, it transmits capability exchange commands (1803 in the operation 3, 1836, 1838 and 1840 in the operation 7) and exchanges the capabilities (S1905), and then determines whether or not all the capability resources for use are available. In the case where all the capability resources for use are available (YES in S1906), it transmits reservation commands (1805 in the operation 3, 1842, 1844 and 1846 in the operation 7) to the devices for use so as to reserve the capability resources of the devices (S1907). In the operation 3, the reservation command is transmitted to the STB 102 connected with the display apparatus 103. In the operation 7, the reservation commands are transmitted to the STB 102, video shooting apparatus 107 and a PC ill.

Next, on receiving reservation confirmations (1806 in the operation 3, 1843, 1845 and 1847 in the operation 7) from the devices having transmitted the reservation commands, the operation command executing portion 209 transmits the operation command and executes a relevant operation (S1908). In the case where there is an operation for transmitting the operation and control commands in the operation history table shown in FIGS. 9A and 9B (S1909), a display command (1807) and a data transfer command (1848) are transmitted (S1910) so as to execute the operation command on the devices (S1911).

In the case where it is necessary to transmit the contents data stored in the storage device 110 and recorded together with the operation command history data as in the operation 3 (S1912), the contents data is read out of the storage device 110 to deliver the contents (S1913). In the case where the contents from the devices are received (S1914) by the system 2 as with the video (1849) from the video shooting apparatus 107 as in the operation 7, the videos (1853, 1855) as the contents are transmitted (S1915). The above-mentioned processing (S1909 to 1915) is executed until there is no operation command history data (NO in S1916). When there is no more operation command history data (YES in S1916), this processing is finished.

Thus, it is possible, in another system, to reproduce the same action easily and reproduce, view and print the contents effectively.

As the capabilities of the devices necessary to execute the operation can be reserved in advance, it no longer happens that the reproduction becomes impossible halfway through the execution after performing the operation.

According to this embodiment, the wireless access point 101 was the operation recording apparatus. However, another apparatus such as the STB 102 or the storage apparatus 104 may also be the operation recording apparatus.

The operation history table was recorded in the storage device 110 in the wireless access point 101. However, the storage device 110 may be connected not only to the wireless access point 101 but also to the device such as the STB 102 or the storage apparatus 104.

Furthermore, the STB 102 was used as the operation input device. However, the operations may be performed by the storage apparatus 104 or the like or may also be dispersed among the devices and performed respectively. In that case, there should be a configuration in which, on performing an internal operation of the devices, that internal operation command is sent over the network and is received and recorded by the device for storing it in the operation history table.

The other system acquired the operation history table via the storage device 110. However, the operation history table may also be acquired via the network. Furthermore, it is also possible to acquire only the operation history table via the storage device 110 or via the network and transfer the contents for use from the original system via the network per instruction from displayed operation command information.

Furthermore, all the contents data was also transferred by way of the wireless access point 101. In the case of the operation command related to the original contents, however, the contents data may also be transferred directly between the devices on either recording or executing the operation command history data.

This embodiment was described by taking an example of the case where one operation input device is connected to the network. However, the present invention is also applicable to the case where multiple operation input devices are connected. In that case, the operation recording apparatus should record the operation command history data as to each of the operation input devices.

The present invention is applicable either to the system configured by multiple devices (such as a host computer, an interface device, a reader and a printer) or to the apparatus consisting of one device (such as a copying machine or a facsimile).

It is also possible to provide the system or the apparatus with a recording medium having a program code of software for realizing the functions of the aforementioned embodiments recorded thereon so that the computer (a CPU or an MPU) of the system or the apparatus reads and executes the program code stored in the recording medium. It goes without saying that the object of the present invention is thereby attained.

In this case, the program code itself read out of the recording medium realizes the functions of the embodiments, where the recording medium having the program code stored therein configures the present invention.

As for the recording medium for supplying the program code, it is possible to use a floppy (registered trademark) disk, a hard disk, an optical disk, a magnetic optical disk, a CD-ROM, a CD-R, a magnetic tape, a nonvolatile memory card or a ROM for instance.

It goes without saying that not only the functions of the aforementioned embodiments are realized by executing the program code read out by the computer but the following cases are also included. To be more specific, it includes the case where an OS (Operating System) or the like running on the computer based on an instruction of the program code executes a part or all of actual processing whereby the functions of the aforementioned embodiments are realized.

Furthermore, the program code read out of the recording medium writes to a memory provided to an expansion board inserted into the computer or an expansion unit connected to the computer. Thereafter, the CPU or the like provided to the expansion board or the expansion unit executes a part or all of the actual processing based on an instruction of the program code, whereby the functions of the aforementioned embodiments are realized. It goes without saying that this case is also included.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-300163, filed Oct. 14, 2005, which is hereby incorporated by reference herein in its entirety.

What is claimed is:

1. An operation reproducing method executed by an information processing apparatus in a first network system, comprising:
    a readout step of reading out operation history information from a memory, the operation history information including operation commands transmitted to devices in a second network system when a series of operations using the devices is performed, the devices used for the operations, and capabilities of the devices used for the operations, respectively;
    a determination step of determining whether or not devices which can execute the series of operations included in the operation history information read out in the readout step exist in the first network system;
    a presentation step of displaying and presenting the series of operations included in the operation history information as an operation list in the first network system to a user in a case where it is determined in the determination step that the devices which can execute the series of operations exist in the first network system; and
    an execution step of causing the devices in the first network system to execute a predetermined operation when the user selects the predetermined operation from the operation list presented to the user.

2. The operation reproducing method according to claim 1, wherein the determination step, whether or not the devices which can execute the series of operations exist in the first network system is determined according to sufficing of the capabilities of the devices used for the operation and resources of the capabilities.

3. The operation reproducing method according to claim 1, wherein the presentation step, the operation list in the first network system is displayed on a display unit of the first network system.

4. The operation reproducing method according to claim 1, further comprising a reproduction step of reproducing the operation selected from the presented operations.

5. An operation reproducing apparatus of a first network system capable of reproducing an operation using multiple devices on a network performed in another network system, comprising:
    a readout unit adapted to read out operation history information from a memory, the operation history information including operation commands transmitted to devices in a second network system when a series of operations using the devices is performed, the devices used for the operations, and capabilities of the devices used for the operations;
    a determination unit adapted to determine whether or not devices which can execute the series of operations included in the operation history information read out by the readout unit exist in the first network system;
    a presentation unit adapted to display and present the series of operations included in the operation history information as an operation list in the first network system to a user in a case where it is determined by the determination unit that the devices which can execute the series of operations exist in the first network system; and
    an execution unit adapted to cause the devices in the first network system to execute a predetermined operation when the user selects the predetermined operation from the operation list presented to the user.

6. The operation reproducing apparatus according to claim 5, wherein the determination unit determines whether or not the devices which can execute the series of operations exist in the first network system according to sufficing of the capabilities of the devices used for the operation and resources of the capabilities.

7. The operation reproducing apparatus according to claim 5, wherein the presentation unit controls the operation list in the first network system to be displayed on a display unit of the first network system.

8. The operation reproducing apparatus according to claim 5, further comprising a reproduction unit adapted to reproduce the operation selected from the presented operations.

9. A non-transitory computer-readable recording medium having the program for causing a computer to execute the operation reproducing method according to claim 1 recorded thereon.

10. The method according to claim 1, further comprising a recording step of recording, as the operation history information, an operation command on an operation executed by using devices in the first system, the devices used for the operation and capabilities of the devices used for the operation, which are received from the devices in the first system.

11. The apparatus according to claim 5, further comprising a recording unit that records, as the operation history information, an operation command on an operation executed by using devices in the first system, the devices used for the operation and capabilities of the devices used for the operation, which are received from the devices in the first system.

* * * * *